US012750702B2

(12) United States Patent
Nakarmi

(10) Patent No.: US 12,750,702 B2
(45) Date of Patent: Sep. 29, 2026

(54) FUZZ TESTING IN A WIRELESS COMMUNICATION NETWORK

(71) Applicant: Telefonaktiebolaget LM Ericsson (publ), Stockholm (SE)

(72) Inventor: Prajwol Kumar Nakarmi, Sollentuna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 651 days.

(21) Appl. No.: 18/245,491

(22) PCT Filed: Aug. 19, 2021

(86) PCT No.: PCT/IB2021/057650
§ 371 (c)(1),
(2) Date: Mar. 15, 2023

(87) PCT Pub. No.: WO2022/058818
PCT Pub. Date: Mar. 24, 2022

(65) Prior Publication Data

US 2023/0362691 A1 Nov. 9, 2023

Related U.S. Application Data

(60) Provisional application No. 63/078,688, filed on Sep. 15, 2020.

(51) Int. Cl.
*H04W 24/06* (2009.01)

(52) U.S. Cl.
CPC .................................. *H04W 24/06* (2013.01)

(58) Field of Classification Search
CPC .. H04L 63/1433; H04W 12/12; H04W 24/06; G06F 11/3688; G06F 11/3684
USPC ....................... 370/328, 329, 330; 455/422.1
See application file for complete search history.

(56) References Cited

U.S. PATENT DOCUMENTS

| | | | | |
|---|---|---|---|---|
| 12,189,781 | B1 * | 1/2025 | Williams | G06F 21/577 |
| 2009/0204591 | A1 * | 8/2009 | Kaksonen | G06F 11/3684 717/124 |
| 2016/0350211 | A1 * | 12/2016 | Cecchetti | G06F 11/3696 |
| 2017/0134290 | A1 * | 5/2017 | Zhang | H04L 47/25 |
| 2017/0142069 | A1 * | 5/2017 | Keini | H04L 63/0263 |
| 2019/0268376 | A1 * | 8/2019 | Park | H04L 63/0428 |
| 2020/0213854 | A1 * | 7/2020 | Kim | G06F 11/3006 |

FOREIGN PATENT DOCUMENTS

CN 111628900 A * 9/2020 ............. H04L 43/50

OTHER PUBLICATIONS

"Protocol Buffers", Google Developers, 2021, https://developers.google.com/protocol-buffers.

(Continued)

*Primary Examiner* — David Q Nguyen
(74) *Attorney, Agent, or Firm* — Weisberg I.P. Law, P.A.

(57) ABSTRACT

Fuzz testing equipment fuzz tests a system under test, SUT, configured for use in a wireless communication network. The fuzz test equipment obtains a message specification that governs a certain type of message whose handling by the SUT is to be tested. The fuzz testing equipment mutates the message specification, and performs, or assists with, testing of the SUT using a message that is fuzzed based on the mutated message specification.

14 Claims, 22 Drawing Sheets

(56) References Cited

OTHER PUBLICATIONS

3GPP, TS 38.331 V16.1.0, "3rd Generation Partnership Project; Technical Specification Group Radio Access Network; NR; Radio Resource Control (RRC) protocol specification (Release 16)", Technical Specification, 3GPP TS 38.331 V16.1.0, Jul. 2020, pp. 1-886, 3GPP, France.
ETSI, "5G; Non-Access-Stratum (NAS) protocol for 5G System (5GS); Stage 3 (3GPP TS 24.501 version 16.5.1 Release 16)", ETSI TS 124 501 V16.5.1, Aug. 2020.
ETSI, "5G; NR; NR and NG-RAN Overall description; Stage-2 (3GPP TS 38.300 version 16.2.0 Release 16)", ETSI TS 138 300 V16.2.0, Jul. 2020.
ETSI, "5G; System architecture for the 5G System (5GS) (3GPP TS 23.501 version 16.5.0 Release 16)", Technical Specification, TS 123 501 V16.5.0, Jun. 2020.
ETSI, "LTE; Evolved Universal Terrestrial Radio Access (E-UTRA); Radio Resource Control (RRC); Protocol specification (3GPP TS 36.331 version 16.1.1 Release 16)", ETSI TS 136 331 V16.1.1, Jul. 2020.
ETSI, "Welcome to ETSI's Official TTCN-3 Homepage, Testing and test control notation version 3 (TTCN-3)", 2021, http://www.ttcn-3.org/.
Helin, "Radamsa, a general purpose fuzzer", 2021, https://gitlab.com/akihe/radamsa.
ITU, "X.680-X.693 : Information Technology—Abstract Syntax Notation One (ASN.1) & ASN.1 encoding rules", 2021, https://www.itu.int/rec/T-REC-X.680-X.693-202102-I/en.
Johansson et al., "T-Fuzz: Model-Based Fuzzing for Robustness Testing of Telecommunication Protocols", 2014 EEE Seventh International Conference on Software Testing, Verification and Validation, IEEE, Mar. 31-Apr. 4, 2014.
Zalewski et al., "american fuzzy lop", GitHub, 2021, https://github.com/google/AFL.

* cited by examiner

FUZZ TESTING IN A WIRELESS COMMUNICATION NETWORK

PRIORITY CLAIM

This application is a national stage application of International Patent Application No. PCT/IB2021/057650, filed Aug. 19, 2021, which claims priority to U.S. Provisional Application No. 63/078,688, Sep. 15, 2020, the disclosure disclosures of which are hereby incorporated in their entirety by reference.

TECHNICAL FIELD

The present application relates generally to a wireless communication network, and relates more particularly to fuzz testing in such a network.

BACKGROUND

The hardware systems and software systems of a wireless communication network must be robust against failures in order to ensure high network availability. One source of failure in a wireless communication network originates from a hardware or software system being ill-equipped to gracefully handle unexpected input, such as a message with unexpected field values. This may be the result, for instance, of telecommunication standards being implemented by different vendors, leading to human errors or poor coding practices that introduce implementation bugs. Fuzz testing can be used in this regard to proactively identify such an ill-equipped system, even before deployment. Fuzz testing entails injecting messages into a system under test (SUT) and monitoring the SUT for unwanted behavior.

Challenges nonetheless exist in exploiting fuzz testing in a wireless communication network context. Messages exchanged in a wireless communication network are typically governed by standardized protocols or interfaces, such as those specified by the 3$^{rd}$ Generation Partnership Project (3GPP). Fuzz testing heretofore can help equip an SUT to gracefully handle unexpected messages, but only within the bounds of these standardized protocols or interfaces.

SUMMARY

Some embodiments herein fuzz test a system under test (SUT) in a wireless communication network, in order to test the SUT's handling of a certain type of message input to the SUT. Rather than fuzzing the message based on a message specification governing that certain type of message, though, some embodiments herein fuzz the message based on a mutated version of that message specification. The message specification may be mutated, for example, to relax one or more requirements on the message's field values, field names, field types, or the like. Mutating the message specification in these or other ways may advantageously free message fuzzing from at least some of the constraints imposed by the message specification, so as to effectively expand fuzz testing beyond the bounds of that message specification. This may in turn safeguard the SUT against additional types of failures and correspondingly improve network robustness and availability.

More particularly, embodiments herein include a method performed by fuzz testing equipment for fuzz testing a system under test (SUT) configured for use in a wireless communication network. The method comprises obtaining a message specification that governs a certain type of message whose handling by the SUT is to be tested. The method also comprises mutating the message specification. In some embodiments, the method further comprises performing, or assisting with, testing of the SUT using a message that is fuzzed based on the mutated message specification.

In some embodiments, the message specification specifies one or more requirements in order for a message to conform to the message specification. In this case, mutating the message specification may comprise mutating at least one of the one or more requirements, e.g., by relaxing at least one of the one or more requirements.

For example, in some embodiments, the one or more requirements include a field value requirement. In this case, the field value requirement requires a field of a message of the certain type to have a value included in a set of one or more valid values in order for the message to conform to the message specification, and mutating at least one of the one or more requirements comprises relaxing the field value requirement by adding one or more additional valid values to the set of one or more valid values.

As another example, in some embodiments, the one or more requirements include a data type requirement. In this case, the data type requirement requires a field of a message of the certain type to have a certain data type in order for the message to conform to the message specification, and mutating at least one of the one or more requirements comprises changing the data type requirement to require the field of the message to have a different data type.

As yet another example, in some embodiments, the one or more requirements include a field name requirement. In this case, the field name requirement requires a field of a message of the certain type to have a certain name in order for the message to conform to the message specification, and mutating at least one of the one or more requirements comprises changing the field name requirement to require the field of the message to have a different name.

As still another example, in some embodiments, the one or more requirements include a field value length requirement. In this case, the field value length requirement requires a value of a field of a message of the certain type to have a certain length in order for the message to conform to the message specification, and mutating at least one of the one or more requirements comprises changing the field value length requirement to require a value of the field of the message to have a different length.

As another example, in some embodiments, the one or more requirements include a field requirement. In this case, the field requirement requires a message of the certain type to have a set of one or more required fields in order for the message to conform to the message specification, and mutating at least one of the one or more requirements comprises adding a required field to the set and/or removing a required field from the set.

Regardless, in some embodiments, performing testing of the SUT comprises fuzzing a message of the certain type based on the mutated message specification, and testing the SUT by sending the fuzzed message to the SUT. In one or more of these embodiments, fuzzing the message of the certain type based on the mutated message specification comprises compiling, based on the mutated message specification, a message data structure that defines a data structure of a message conforming to the mutated message specification, and obtaining the fuzzed message as a message that has a data structure defined by the compiled message data structure. Alternatively or additionally, in some embodiments, the message specification and the mutated message specification are each specified in terms of an interface description language which is programming language agnostic, and the compiled message data structure defines a programming language specific data structure of a message conforming to the mutated message specification.

In these and other embodiments, obtaining the fuzzed message may comprise generating, from scratch, the fuzzed message as a message that has a data structure defined by the compiled message data structure.

Alternatively, the method may further comprise compiling a message decoder based on the message specification, and decoding a nominal message using the compiled message decoder. In this case, obtaining the fuzzed message comprises obtaining the fuzzed message as a function of the decoded nominal message and the compiled message data structure. In one or more of these embodiments, obtaining the fuzzed message comprises copying fields from the decoded nominal message into a fuzzable message that is based on the complied message data structure, and obtaining the fuzzed message by fuzzing the fuzzable message.

In some embodiments, the method further comprises compiling a message encoder based on the mutated message specification, and encoding the fuzzed message using the compiled message encoder. In this case, sending the fuzzed message to the SUT comprises sending the fuzzed message as encoded to the SUT.

In some embodiments, assisting with testing of the SUT comprises sending the mutated message specification to other fuzz testing equipment configured to test the SUT using a message that is fuzzed based on the mutated message specification.

In some embodiments, the message specification is specified in an Interface Description Language, IDL. In one or more of these embodiments, the IDL is Abstract Syntax Notation One, ASN.1.

In some embodiments, the certain type of message is a Radio Resource Control, RRC, message, and the fuzzed message is a fuzzed RRC message. In other embodiments, the certain type of message is a Non-Access Stratum, NAS, message, and the fuzzed message is a fuzzed NAS message.

In some embodiments, the fuzz testing equipment is implemented in a wireless communication device and the SUT is a radio network node. In other embodiments, the fuzz testing equipment is implemented in a radio network node and the SUT is a wireless communication device.

Other embodiments herein include fuzz testing equipment configured as described above. In this regard, the fuzz testing equipment, e.g., via processing circuitry, may be configured to obtain a message specification that governs a certain type of message whose handling by the SUT is to be tested. The fuzz testing equipment may also be configured to mutate the message specification. The fuzz testing equipment may further be configured to perform, or assist with, testing of the SUT using a message that is fuzzed based on the mutated message specification.

Other embodiments herein include a computer program comprising instructions which, when executed by at least one processor of fuzz testing equipment, causes the fuzz testing equipment to perform as described above. In some embodiments, a carrier containing the computer program is one of an electronic signal, optical signal, radio signal, or computer readable storage medium.

Of course, embodiments herein are not limited to the above features and advantages. Indeed, those skilled in the art will recognize additional features and advantages upon reading the following detailed description, and upon viewing the accompanying drawings.

DETAILED DESCRIPTION

Figure 1:
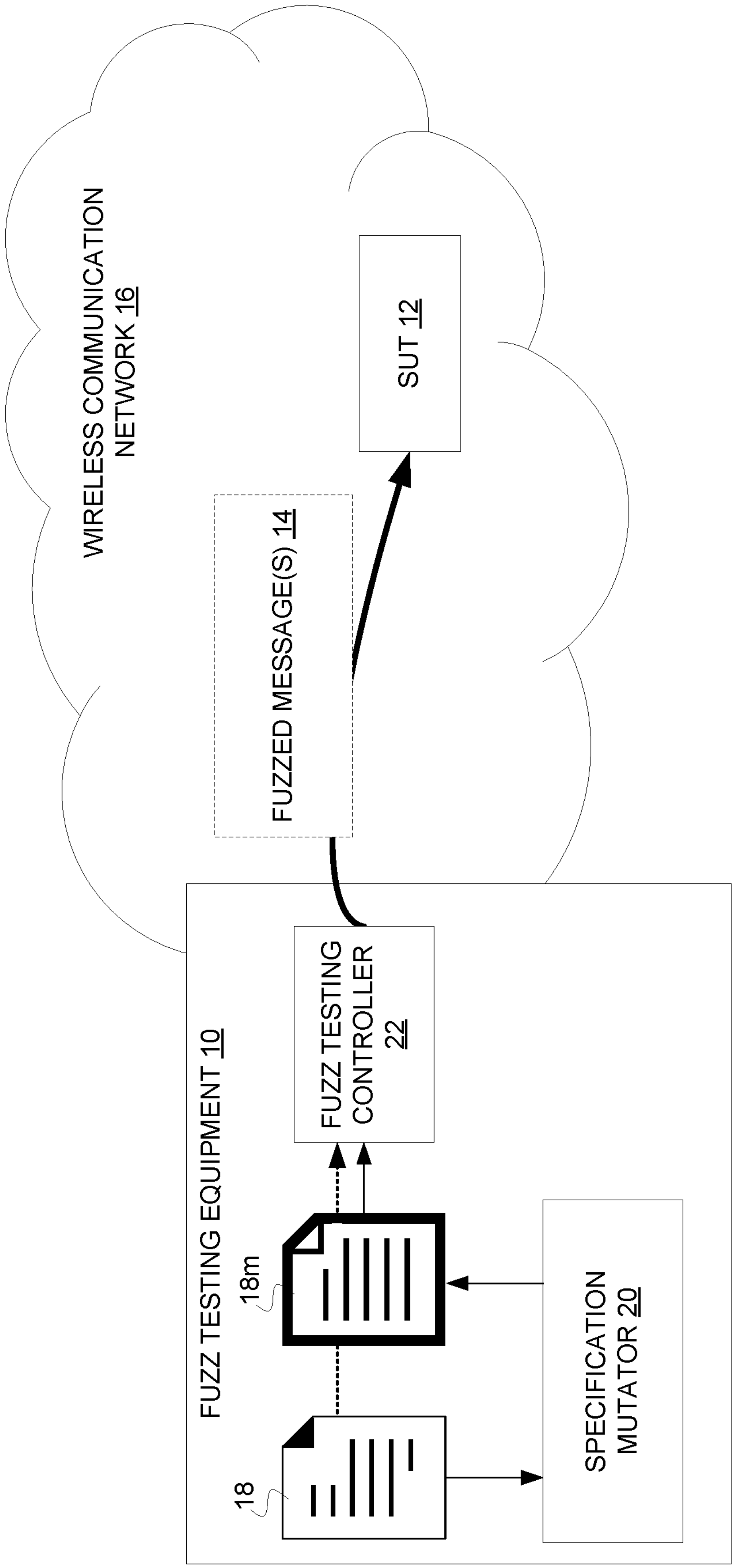
FIG. 1 is a block diagram of fuzz testing equipment according to some embodiments.

FIG. 1 shows fuzz testing equipment 10 according to some embodiments. The fuzz testing equipment 10 is configured for fuzz testing a system under test (SUT) 12. Fuzz testing the SUT 12 entails inputting one or more fuzzed messages 14 to the SUT 12 and monitoring how the SUT 12 handles the message(s) 14. Each fuzzed message 14 may constitute "fuzz" in the sense that it conveys invalid, unexpected, malicious, or random data. The fuzz testing equipment 10 may for example fuzz a message by introducing into the message random data, or data carefully chosen to be invalid, unexpected, or malicious. The fuzzed message may then be sent to the SUT 12 in order to test the impact of such fuzz on the SUT 12. For example, fuzz testing may evaluate the extent to which the SUT 12 gracefully handles the fuzzed message(s) 14 in a planned way (e.g., producing an appropriate log or report, or ignoring or rejecting the message) versus ungracefully handling the fuzzed message(s) 14 in a surprising or unplanned way (e.g., crashing, running out of memory, getting stuck in a deadlock, producing the wrong state, failing to send a communication or sending the wrong communication, etc.). Fuzz testing may thereby help identify what sort of messages the SUT 12 needs to be better equipped to handle, for improving the SUT's robustness to varied message input.

In some embodiments, the fuzz testing equipment 10 tests the SUT's handling of a certain type of message. This certain type of message may for example be a certain type of message transmitted to an SUT 12 that is configured for use in a wireless communication network 16, as shown in FIG. 1. Fuzz testing equipment 10 may for instance test the SUT's handling of a Radio Resource Control (RRC) message as one example of the certain type, or test the SUT's handling of a Non-Access Stratum (NAS) message as another example of the certain type.

In these and other contexts, the certain type of message whose handling by the SUT 12 is tested may be governed by a message specification 18, e.g., specified in an Interface Description Language (IDL) such as Abstract Syntax Notation One (ASN.1). The message specification 18 may for instance specify one or more characteristics of a message of the certain type, e.g., as capabilities of or requirements on such a message. Such characteristic(s) may include for example the field(s) of the message, the possible values of each field, the lengths of each field, the types of each field, etc. The message specification 18 may specify these or other aspects of the certain type of message in accordance with a standardized protocol or interface, e.g., as established by a standardization body such as the 3rd Generation Partnership Project (3GPP). For example, in embodiments that test the SUT's handling of an RRC message, the RRC message may be governed by Technical Specification (TS) 38.331 as specified by 3GPP. Or, in embodiments that test the SUT's handling of a NAS message, the NAS message may be governed by TS 24.501 as specified by 3GPP. Note, though, that the message specification 18 may govern the certain type of message at any level of granularity or protocol stack level. For example, in some embodiments, the message specification 18 governs any message that is an RRC message, whereas in other embodiments the message specification 18 governs any message that is a certain type of RRC message.

Notably, though, rather than fuzzing the message(s) 14 of the certain type based directly on the message specification 18 that governs that certain type of message, some embodiments herein fuzz the message(s) 14 based on a mutated version of that message specification 18. As shown in FIG. 1 in this regard, the fuzz testing equipment 10 obtains the message specification 18 that governs the certain type of message whose handling by the SUT 12 is to be tested. The fuzz testing equipment 10 (e.g., via specification mutator 20) mutates this message specification 18, to obtain a mutated message specification 18*m*. The mutated message specification 18*m* may be mutated in the sense that the mutated message specification 18*m* is at least partly changed as compared to the message specification 18. The fuzz testing equipment 10 (e.g., via fuzz testing controller 22) may then perform, or assist with, testing of the SUT 12 using a fuzzed message 14 that is fuzzed based on the mutated message specification 18*m*.

Mutating the message specification 18 for fuzz testing may advantageously free message fuzzing from at least some of constraints imposed by the message specification 18, so as to effectively expand fuzz testing beyond the bounds of that message specification 18. This may in turn safeguard the SUT 12 against additional types of failures and correspondingly improve network robustness and availability.

Figure 2:
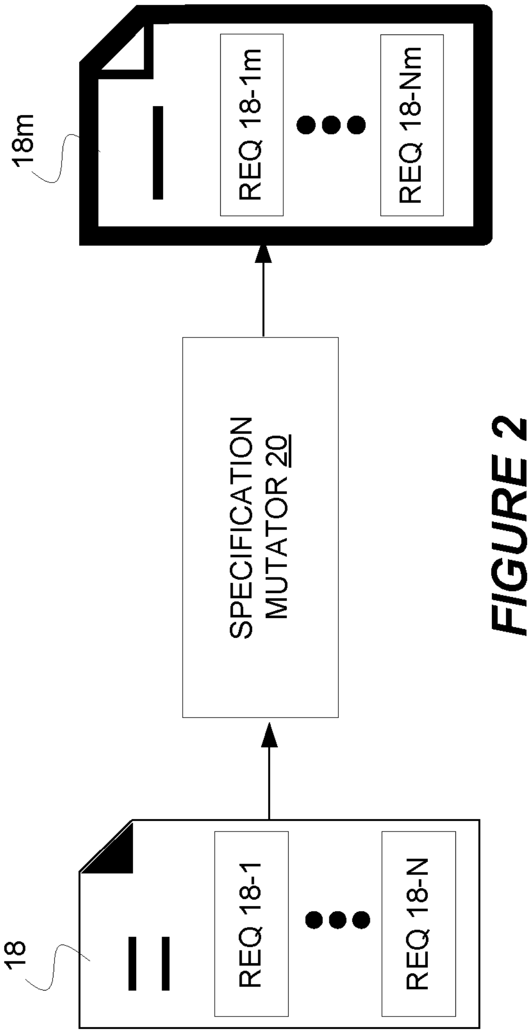
FIG. 2 is a block diagram of a specification mutator according to some embodiments.

In some embodiments as shown in FIG. 2, for example, the message specification 18 specifies one or more requirements 18-1 . . . 18-N on a message of the certain type, e.g., requirement(s) in order for a message of the certain type to conform to the message specification 18. In such a case, the fuzz testing equipment 10 according to some embodiments may mutate the message specification 18 by mutating at least one of the one or more requirements 18-1 . . . 18-N. FIG. 2 for instance shows that the mutated message specification 20 may specify one or more mutated requirements 18-1*m* . . . 18-Nm, in place of the one or more requirements 18-1 . . . 18-N specified by the unmutated message specification 18. Note, however, that mutation of a requirement in some embodiments may constitute a change in either the requirement's contents or the requirement's presence. In the latter case, then, mutating a requirement in the message specification 18 may in some embodiments comprise removal of the requirement, so that no such requirement is specified in the mutated message specification 18*m*. Regardless, in these and other embodiments, mutating the message specification 18 may effectively relax at least one of the one or more requirements 18-1 . . . 18-N imposed by the message specification 18.

Figure 3A:
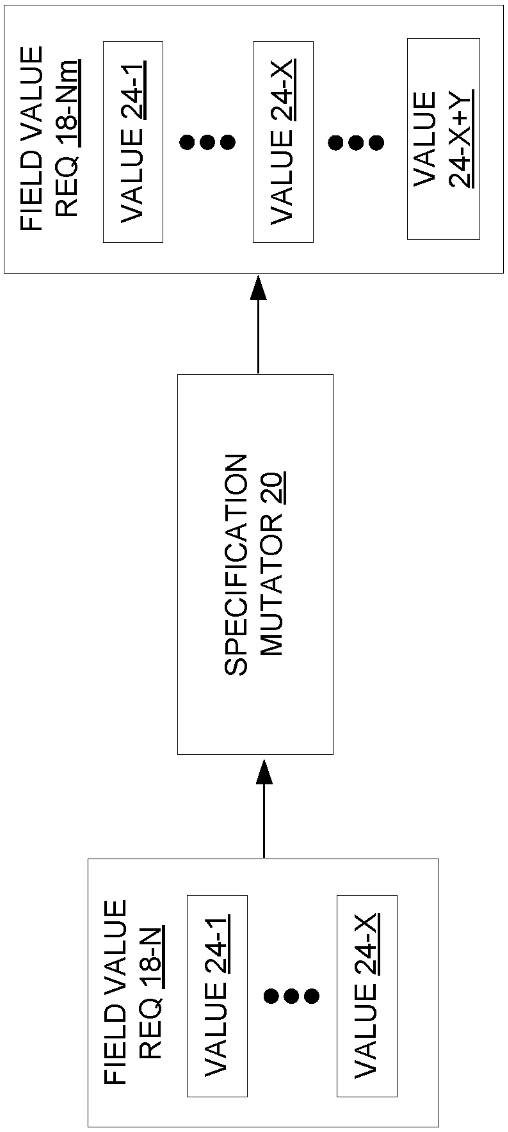
FIG. 3A is a block diagram of specification mutation according to some embodiments.

FIGS. 3A-3E illustrate a few examples. As shown in FIG. 3A, the message specification 18 specifies a field value requirement 18-N. The field value requirement 18-N requires a field of a message of the certain type to have a value included in a set of one or more valid values 24-1 . . . 24-X, in order for the message to conform to the message specification 18. That is, the message specification 18 specifies the possible values that a certain field of the message can have. In order to relax the field value requirement 18-N, some embodiments mutate the field value requirement 18-N by adding one or more additional valid values to the set of one or more valid values. As shown in FIG. 3A, for example, the mutated field value requirement 18-Nm requires the field of the message of the certain type to have a value included in a set of one or more valid values 24-1 . . . 24-X+Y. Here, the set of valid values includes not only the valid values 24-1 . . . 24-X specified by the unmutated message specification 18 but also one or more additional valid values 24-X+1 . . . 24-X+Y. By allowing the field to have additional values as compared to the unmutated message specification 18, the mutated message specification 18*m* enables fuzz testing to test the SUT's handling of additional field values so as to enable increased robustness.

As a concrete example, the message specification 18 may specify that an establishmentCause field of an RRC Setup Request message must have one of multiple values included in a set of allowed values, where the set of allowed values includes "emergency", "highPriorityAccess", "mt-Access", "mo-Signaling", "mo-Data", "mo-VoiceCall" "mo-VideoCall", "mo-SMS", "mps-PriorityAccess", "mcs-PriorityAccess", "spare6", "spare5", "spare4", "spare3", "spare2", and "spare1". Some embodiments mutate the message specification 18 so that the set of allowed values for the establishmentCause field includes one or more additional values, such as "fuzz1", "fuzz2", "fuzz3", etc. This way, fuzz testing can test the SUT's handling of an RRC Setup Request message which has an establishmentCause field with a value that does not conform to the message specification 18.

As another concrete example, the message specification 18 may specify that a relativeTimeStamp-r16 field of a UEinformationResponse message must have one of multiple values included in a set of allowed values, where the set of allowed values includes values from 0 to 7200. Some embodiments mutate the message specification 18 so that the set of allowed values for the relativeTimeStamp-r16 field includes values from 0 to 8000. This way, fuzz testing can test the SUT's handling of an RRC Setup Request message which has a relativeTimeStamp-r16 field with a value that does not conform to the message specification 18.

Figure 3B:
FIG. 3B is a block diagram of specification mutation according to other embodiments.

In other embodiments, FIG. 3B shows the message specification 18 specifies a data type requirement 18-N. The data type requirement 18-N requires a field of a message of the certain type to have a certain data type, in order for the message to conform to the message specification 18. That is, the message specification 18 specifies the type of data that a certain field of the message must convey. Some embodiments mutate the data type requirement 18-N by changing the data type requirement 18-N to require the field of the message to have a different data type. As shown in FIG. 3B, for example, the mutated data type requirement 18-Nm requires the message's field to have a different data type 26*m* than the data type 26 required by the unmutated data type requirement 18-N. The mutated message specification 18*m* thereby enables fuzz testing to test the SUT's handling of a field that conveys a data type that does not conform to the message specification, so as to enable increased robustness.

As a concrete example, the message specification 18 may specify that an RRC-TransactionIdentifier field of an RRC message must have an integer data type. Some embodiments mutate the message specification 18 so that the RRC-TransactionIdentifier field must have an enumerated data type, e.g., with the only allowed value being "true". This way, fuzz testing can test the SUT's handling of an RRC-TransactionIdentifier field which has a data type that does not conform to the message specification 18.

Figure 3C:
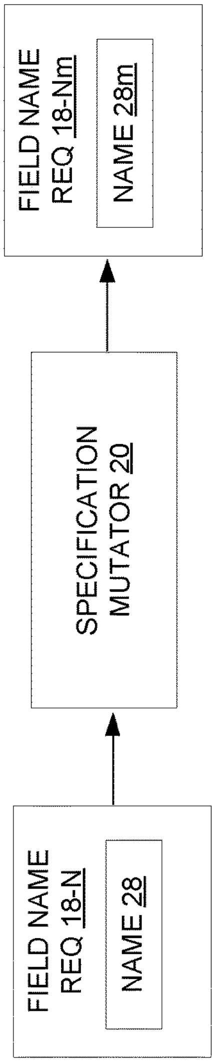
FIG. 3C is a block diagram of specification mutation according to yet other embodiments.

In other embodiments, FIG. 3C shows the message specification 18 specifies a field name requirement 18-N. The field name requirement 18-N requires a field of a message of the certain type to have a certain name, in order for the message to conform to the message specification 18. That is, the message specification 18 specifies the name that a certain field of the message must have. Some embodiments mutate the field name requirement 18-N by changing the field name requirement 18-N to require the field of the message to have a different name. As shown in FIG. 3C, for example, the mutated field name requirement 18-Nm requires the message's field to have a different name 28*m* than the name 28 required by the unmutated data type requirement 18-N. The mutated message specification 18*m* thereby enables fuzz testing to test the SUT's handling of a field that has a name that does not conform to the message specification, so as to enable increased robustness.

As a concrete example, the message specification 18 may specify that an RRCSetupComplete message must have a field named registeredAMF. Some embodiments mutate the message specification 18 so that the RRCSetupComplete message must instead have a field named fuzzAMF. This way, fuzz testing can test the SUT's handling of an RRCSetupComplete message which has a field name that does not conform to the message specification 18.

Figure 3D:
FIG. 3D is a block diagram of specification mutation according to still other embodiments.

In yet other embodiments, FIG. 3D shows the message specification 18 specifies a field value length requirement 18-N. The field value length requirement 18-N requires a value of a field of a message of the certain type to have a certain length, in order for the message to conform to the message specification 18. That is, the message specification 18 specifies the length that the value of a certain field of the message must have. Some embodiments mutate the field value length requirement 18-N by changing the field value length requirement 18-N to require the value of the field of the message to have a different length. As shown in FIG. 3D, for example, the mutated field value length requirement 18-Nm requires the message's field to have a value with a different length 30*m* than the length 30 required by the unmutated field value length requirement 18-N. The mutated message specification 18*m* thereby enables fuzz testing to test the SUT's handling of a field that has a value with a length that does not conform to the message specification, so as to enable increased robustness.

As a concrete example, the message specification 18 may specify that a ue-Identity field of an RRCSetupRequest message must have a value with a length of 39 bits. Some embodiments mutate the message specification 18 so that the ue-Identity field must have a value with a length of 50 bits (or, in other embodiments, 10 bits). This way, fuzz testing can test the SUT's handling of an RRCSetupRequest message which has a field with a value that does not conform to the message specification 18 in terms of the value's length.

Figure 3E:
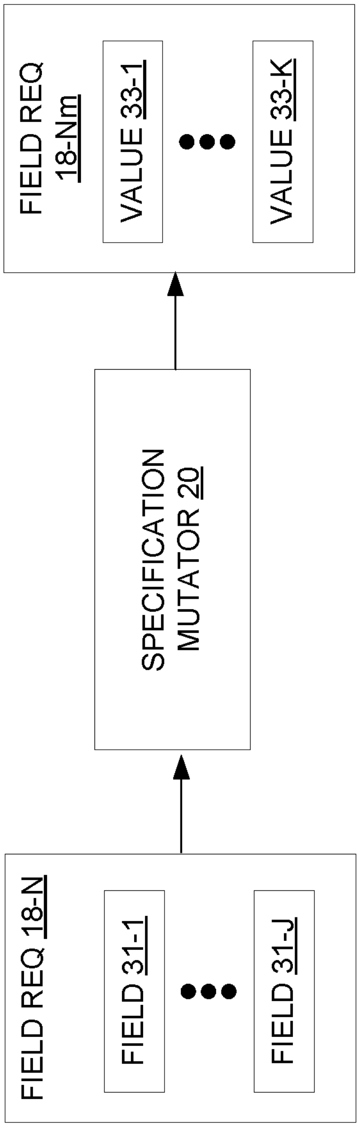
FIG. 3E is a block diagram of specification mutation according to other embodiments.

In still other embodiments, FIG. 3E shows the message specification 18 specifies a field requirement 18-N. The field requirement 18-N requires a message of the certain type to have a set of one or more required fields 31-1 . . . 31-J, in order for the message to conform to the message specification 18. Some embodiments mutate the field requirement 18-N by changing the field requirement 18-N to require the message to have a different set of one or more required fields 33-1 . . . 33-K. This different set of one or more required fields 33-1 . . . 33-K differs from the set of required field(s) 31-1 . . . 31-J in at least one required field. The message specification 18 may be mutated for instance by adding a required field to the set of required field(s) 31-1 . . . 31-J, e.g., such that the set of one or more required fields 33-1 . . . 33-K is the same as the set of required field(s) 31-1 . . . 31-J except that it includes one or more additional fields. As another example, the message specification 18 may be mutated by removing a required field from the set of required field(s) 31-1 . . . 31-J, e.g., such that the set of one or more required fields 33-1 . . . 33-K is the same as the set of required field(s) 31-1 . . . 31-J except that it includes one or more fewer fields. A combination of these examples may be implemented in other instances, such that in general the message specification 18 may be mutated by adding or removing one or more fields to or from the set of required field(s) 31-1 . . . 31-J. The mutated message specification 18*m* thereby enables fuzz testing to test the SUT's handling of a message with one or more fields that do not conform to the message specification 18, so as to enable increased robustness.

As a concrete example, the message specification 18 may specify that an RRCSetupRequest message must have an establishmentCause field. Some embodiments mutate the message specification 18 so that the establishmentCause field is not required. This way, fuzz testing can test the SUT's handling of an RRCSetupRequest message which does not have an establishmentCause field and therefore does not conform to the message specification 18.

As another example, the message specification 18 may specify that an RRCSetupRequest message does not have a timeOfDay field. Some embodiments mutate the message specification 18 so that a timeOfDay field is required. This way, fuzz testing can test the SUT's handling of an RRC-SetupRequest message which has a timeOfDay field and therefore does not conform to the message specification 18.

No matter the particular way in which the message specification 18 is mutated, the fuzz testing equipment 10 in some embodiments fuzzes the message(s) 14 of the certain type based on that mutated message specification 18*m*. In one embodiment, the fuzz testing equipment 10 does so using a generation-based fuzzing approach that generates the fuzzed message(s) 14, e.g., from scratch. In another embodiment, by contrast, the fuzz testing equipment 10 uses a mutation-based fuzzing approach that mutates a nominal (e.g., existing) message in order to obtain the fuzzed message(s) 14.

Figure 4:
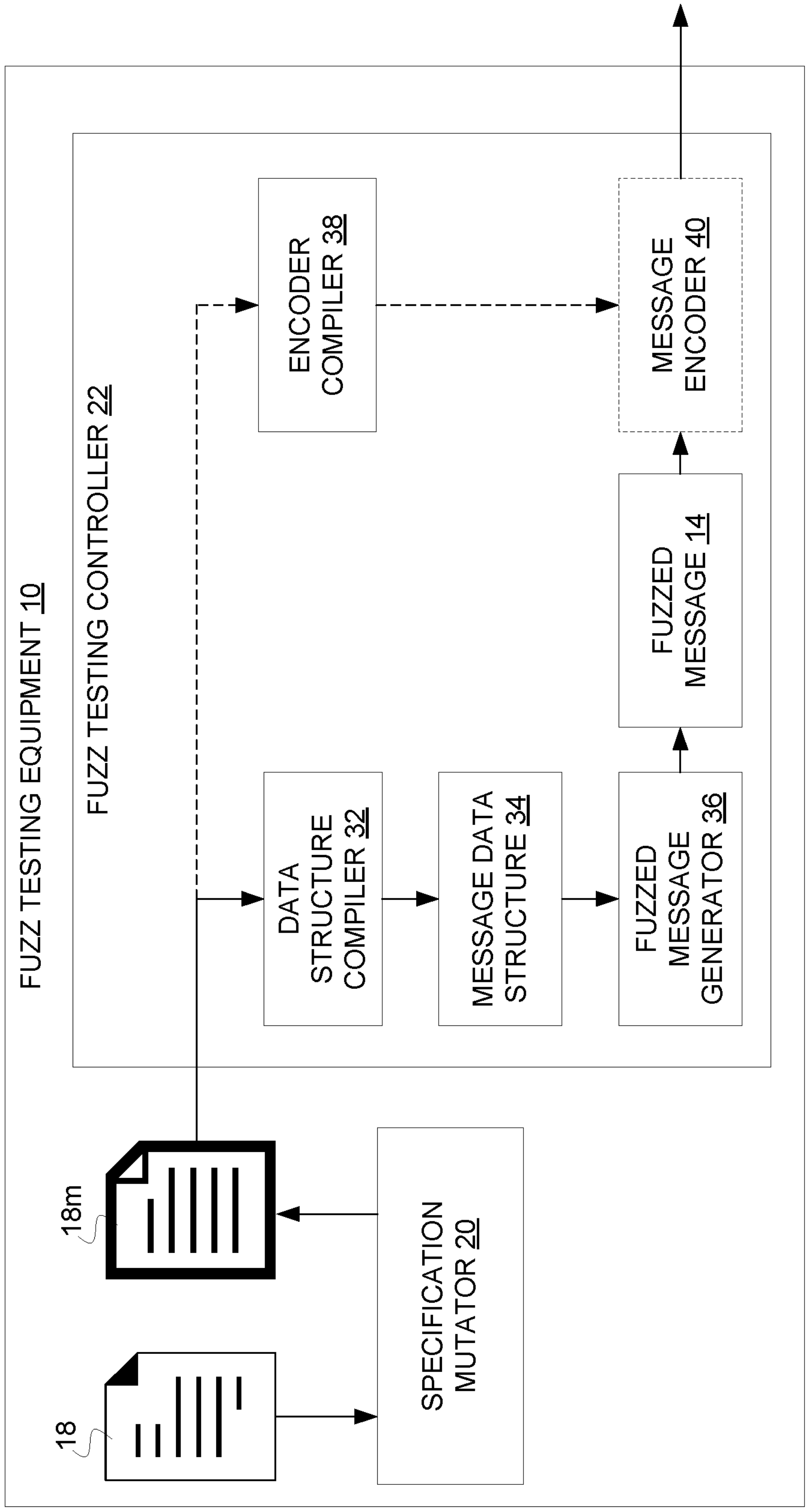
FIG. 4 is a block diagram of fuzz testing equipment according to some embodiments that use a generation-based fuzzing approach.

FIG. 4 shows one example of a generation-based fuzzing approach. As shown, the fuzz testing equipment 10 includes a data structure compiler 32. The data structure compiler 32 compiles a message data structure 34 based on the mutated message specification 18*m*. The message data structure 34 defines a data structure of a message (of the certain type) conforming to the mutated message specification 18*m*. A fuzzed message generator 36 generates a fuzzed message 14 based on this message data structure 34. In some embodiments, the fuzzed message generator 36 generates this fuzzed message 14 from scratch, e.g., as opposed to deriving the fuzzed message 14 from an existing, nominal message. Either way, the fuzzed message 14 as generated has a data structure defined by the compiled message data structure 34. With the message data structure 34 defining the data structure of the message in a way that conforms to the mutated message specification 18*m*, the fuzzed message generator 36 thereby effectively generates the fuzzed message 14 based on the mutated message specification 18*m*.

More particularly, in some embodiments, the message data structure 34 defines a programming language specific data structure of a message that conforms to the mutated message specification 18*m*. The message data structure 34 may for instance be specific to the C programming language, e.g., in the form of a "struct" which declares one or more C structure variables for representing one or more corresponding fields of the message according to the mutated message specification 18*m*. As another example, the message data structure 34 may be specific to a C++ programming language, e.g., in the form of a class or object which declares one or more data members for representing one or more corresponding fields of the message according to the mutated message specification 18*m*. In some embodiments, then, the message data structure 34 may be referred to as a sort of container for containing a message of the certain type in a manner that is specific to a certain programming language and in conformance with the mutated message specification 18*m*. Regardless, in embodiments where the mutated message specification 18*m* is specified in terms of an interface description language (IDL) such as ASN.1, the data structure compiler 32 may effectively use the mutated message specification 18*m* to compile the message data structure 34 in a way that defines the data structure for the fuzzed message 14 in terms of a certain programming language. In a sense, therefore, the data structure compiler 32 translates the mutated message specification 18*m* that is specified at a relatively high level of abstraction into a programming language specific data structure for the fuzzed message 14.

In some embodiments, as shown in FIG. 4, the fuzz testing equipment 10 may encode the fuzzed message 14 before sending the fuzzed message 14 to the SUT 12. The fuzz testing equipment 10 in this regard may further include an encoder compiler 38. The encoder compiler 38 compiles a message encoder 40 based on the mutated message specification 18*m*. The message encoder 40 encodes the fuzzed message 14. Encoding of the fuzzed message 14 may for instance include information or bit level encoding, e.g., so as to encode the fuzzed message 14, as represented by a programming language specific data structure, into one or more bits. Regardless, the fuzz testing equipment 10 may then send the fuzzed message 14, as encoded, to the SUT 12 as part of fuzz testing.

Figure 5:
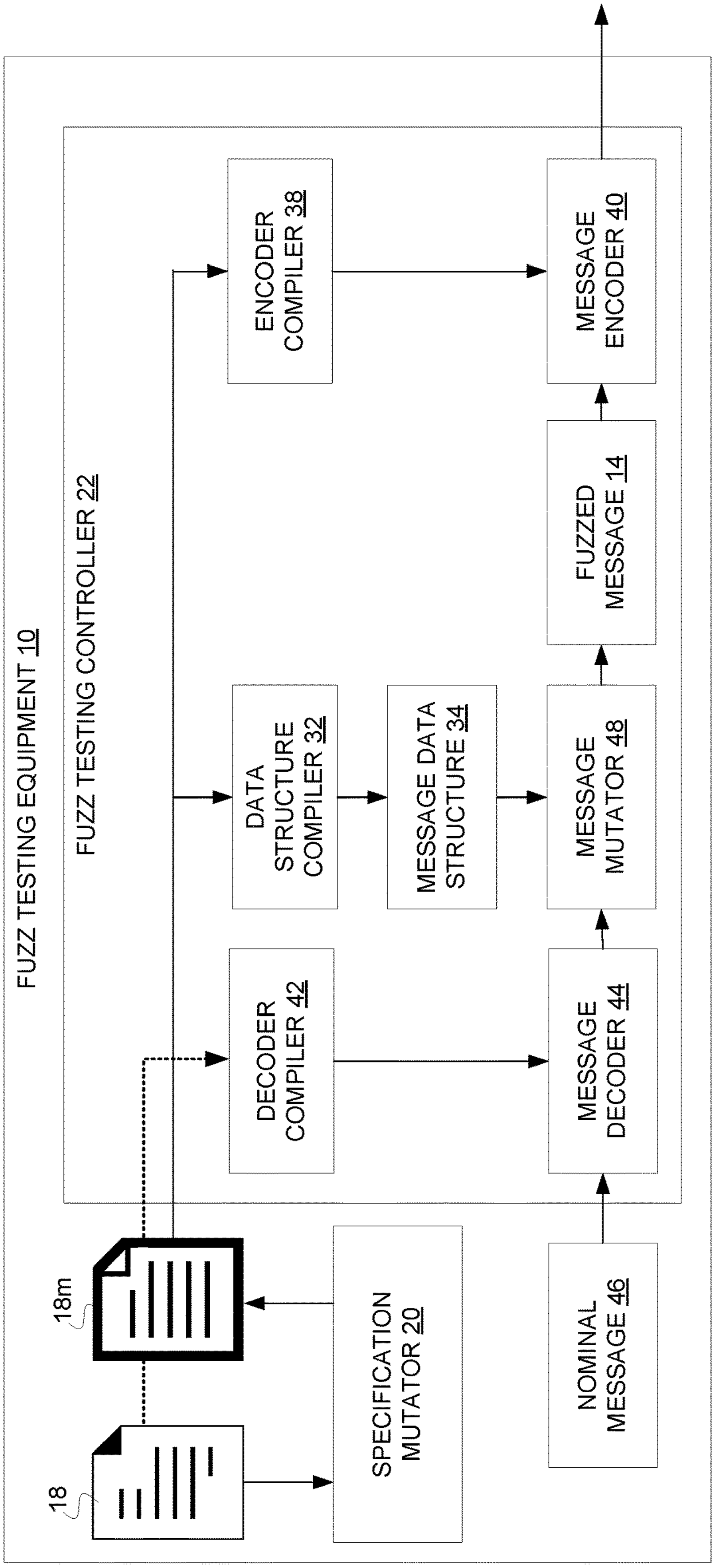
FIG. 5 is a block diagram of fuzz testing equipment according to some embodiments that use a mutation-based fuzzing approach.

FIG. 5 by contrast shows one example of a mutation-based fuzzing approach. As shown, the fuzz testing equipment 10 in one such embodiment further includes a decoder compiler 42. The decoder compiler 42 compiles a message decoder 44. The message decoder 44 decodes a nominal message 46. The nominal message 46 may be for instance an existing or default message of the certain type, from which the fuzzed message 14 is to be derived. A message mutator 48 in this regard mutates the decoded nominal message in order to derive or otherwise obtain the fuzzed message 14. The message mutator 48 mutates the decoded nominal message in conformance with the message data structure 34 that was compiled as described above using the mutated message specification 18*m*. The message mutator 48 may for example mutate the decoded nominal message by adding or removing a field, changing a value of a field, or the like, in a way that would otherwise have been forbidden by the unmutated message specification 18. In practice, though, the decoded nominal message itself may not be amenable to mutation directly. In such a case, the message mutator 48 may copy fields from the decoded nominal message into a new message, referred to as a fuzzable message, that is based on the compiled message data structure 34. The message mutator 48 may then mutate this fuzzable message so as to fuzz the fuzzable message.

Notably, though, the decoder compiler 42 in some embodiments compiles the message decoder 44 based on the message specification 18, i.e., in its unmutated form. By compiling the message decoder 44 based on the (unmutated) message specification 18, the message decoder 44 is able to decode a nominal message 46 that was encoded according to that message specification 18. Some embodiments may thereby enable mutation-based fuzzing that is based on mutation of a message encoded according to the unmutated message specification. In such a case, then, the message decoder 44 may be compiled based on the unmutated message specification 18 whereas the message data structure 34 and/or the message encoder 40 may be based on the mutated message specification 18*m*.

Figure 6:
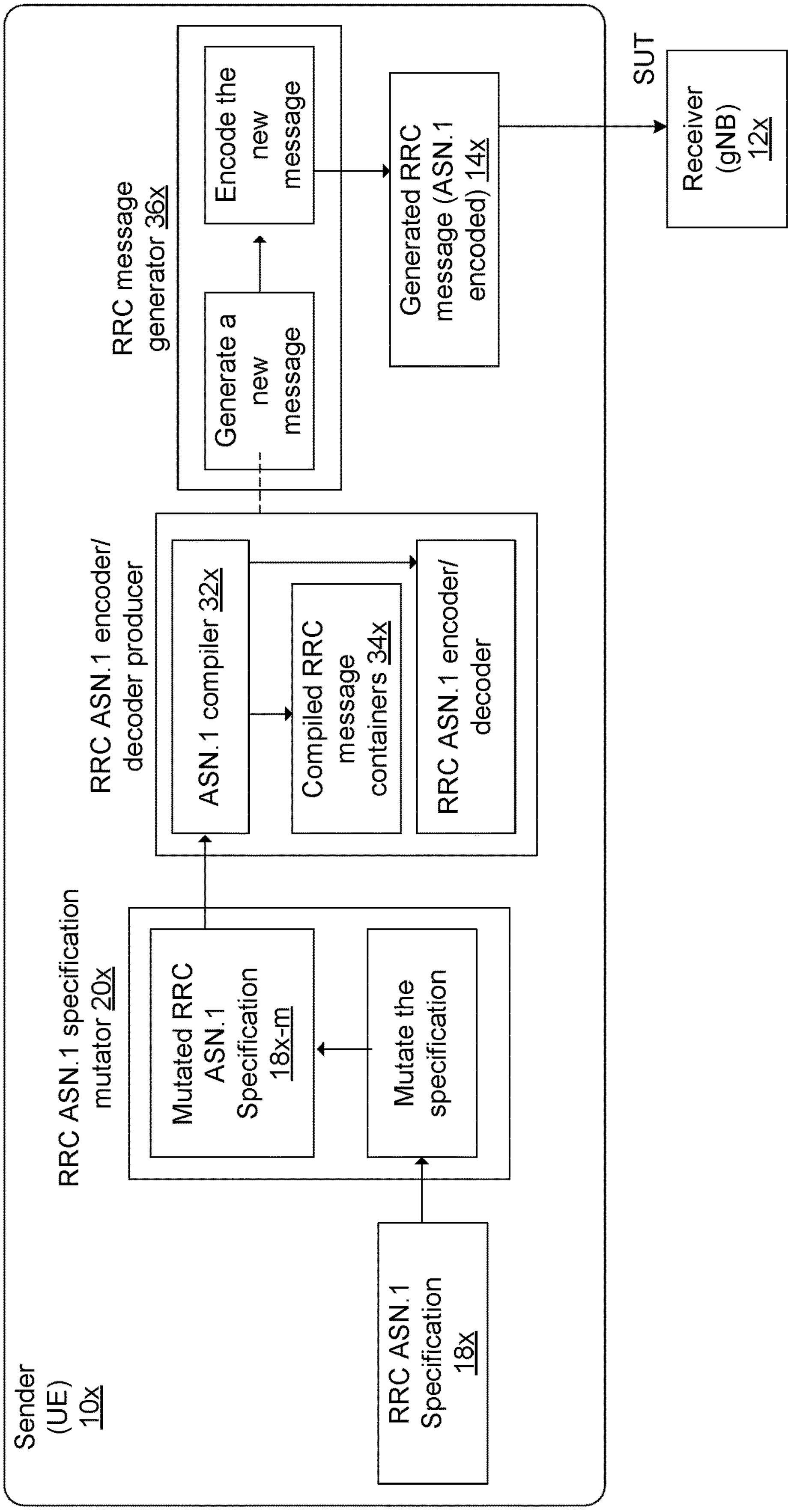
FIG. 6 is a block diagram of generation-based fuzz testing according to some embodiments where a user equipment (UE) fuzz tests handling by a radio network node of a Radio Resource Control (RRC) ASN.1 specification.

Consider now some concrete examples of some embodiments herein in a context where the message specification 18 is an RRC ASN.1 specification 18*x*, the fuzz testing equipment 10 is or mimics a user equipment (UE) 10*x*, and the SUT 12 is a radio network node 12*x* such as a base station. In one generation-based fuzzing example, the specification mutator 20 in FIG. 4 is an RRC ASN.1 specification mutator 20*x* that mutates the RRC ASN.1 specification 18*x* into a mutated RRC ASN.1 specification 18*m-x*, e.g., to get rid of constraints or limitations on fuzz testing. In this case, as shown in FIG. 6, the data structure compiler 32 and the encoder compiler 38 may be part of an ASN.1 compiler 32*x* that compiles the message data structure 34 in the form of one or more compiled RRC message containers 34*x* and compiles the message encoder 40 as an RRC ASN.1 encoder 40*x*. The fuzzed message generator 36 may thereby take the form of an RRC message generator 36*x* that generates an RRC message based on the compiled RRC message container(s) 34*x*, which are based on the mutated RRC ASN.1 specification 18*m-x*. The RRC message container(s) 34*x* therefore do not have constraints or limitations imposed by the original RRC ASN.1 specification 18*x*. The fuzzed message generator 36, in the form of RRC message generator 36*x*, may accordingly generate the fuzzed message 14 as a fuzzed RRC message (ASN.1 encoded) 14*x*. Thus, the RRC message generator 36*x* may freely use values not allowed by the original RRC ASN.1 specification 18*x*, for example. Increasing flexibility of RRC message fuzzing may correspondingly increase the chances of finding bugs in the SUT, e.g., gNB.

Figure 7:
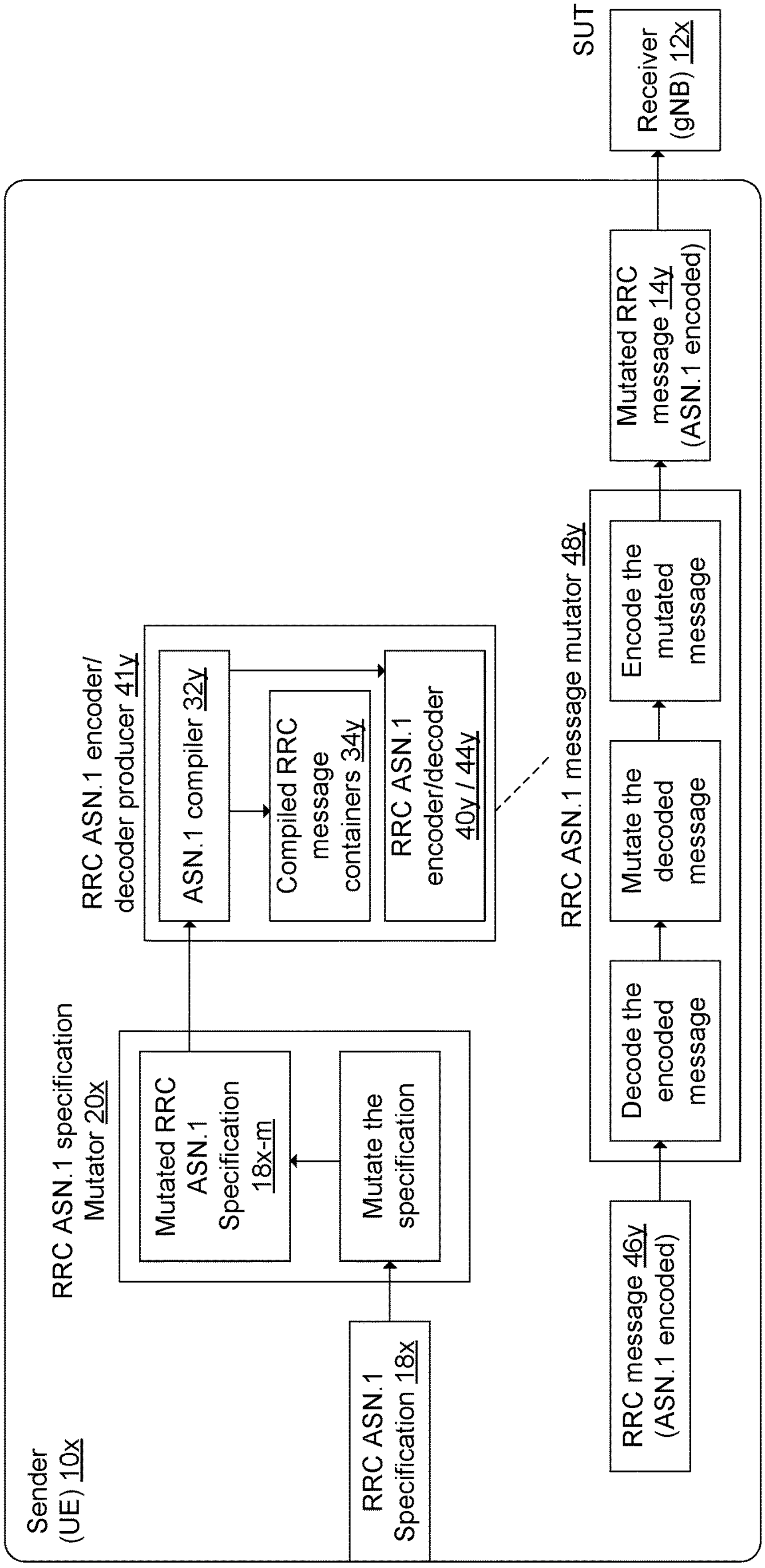
FIG. 7 is a block diagram of mutation-based fuzz testing according to some embodiments where a user equipment (UE) fuzz tests handling by a radio network node of a Radio Resource Control (RRC) ASN.1 specification.

In a mutation-based fuzzing example, the specification mutator 20 in FIG. 5 is also an RRC ASN.1 specification mutator 20*x* that mutates the RRC ASN.1 specification 18*x* into a mutated RRC ASN.1 specification 18*x-m*, e.g., to get rid of constraints or limitations on fuzz testing. But in this case, as shown in FIG. 7, the data structure compiler 32, the decoder compiler 42, and the encoder compiler 38 may be part of an ASN.1 compiler 32*y* that compiles the message data structure 34 in the form of one or more compiled RRC message containers 34*y*, compiles the message encoder 40 as an RRC ASN.1 encoder 40*y*, and compiles the message decoder 44 as an RRC ASN.1 decoder 44*y*. The message decoder 44, message mutator 48, and message encoder 40 may thereby be implemented as shown in FIG. 7 as an RRC ANS.1 message mutator 48*y* that decodes an RRC message 46*y*, mutates the decoded message, and re-encodes the mutated message into a mutated RRC message 14*y*, which is based on the mutated RRC ASN.1 specification 18*x-m*. Here, as above, the RRC message container(s) 34*y* used for message mutation do not have constraints or limitations imposed by the original RRC ASN.1 specification 18*x*. Thus, the RRC ASN.1 message mutator 48*y* may freely use values not allowed by the original RRC ASN.1 specification 18*x*, for example. Increasing flexibility of RRC message fuzzing may correspondingly increase the chances of finding bugs in the SUT, e.g., gNB 12*x*.

Figure 8:
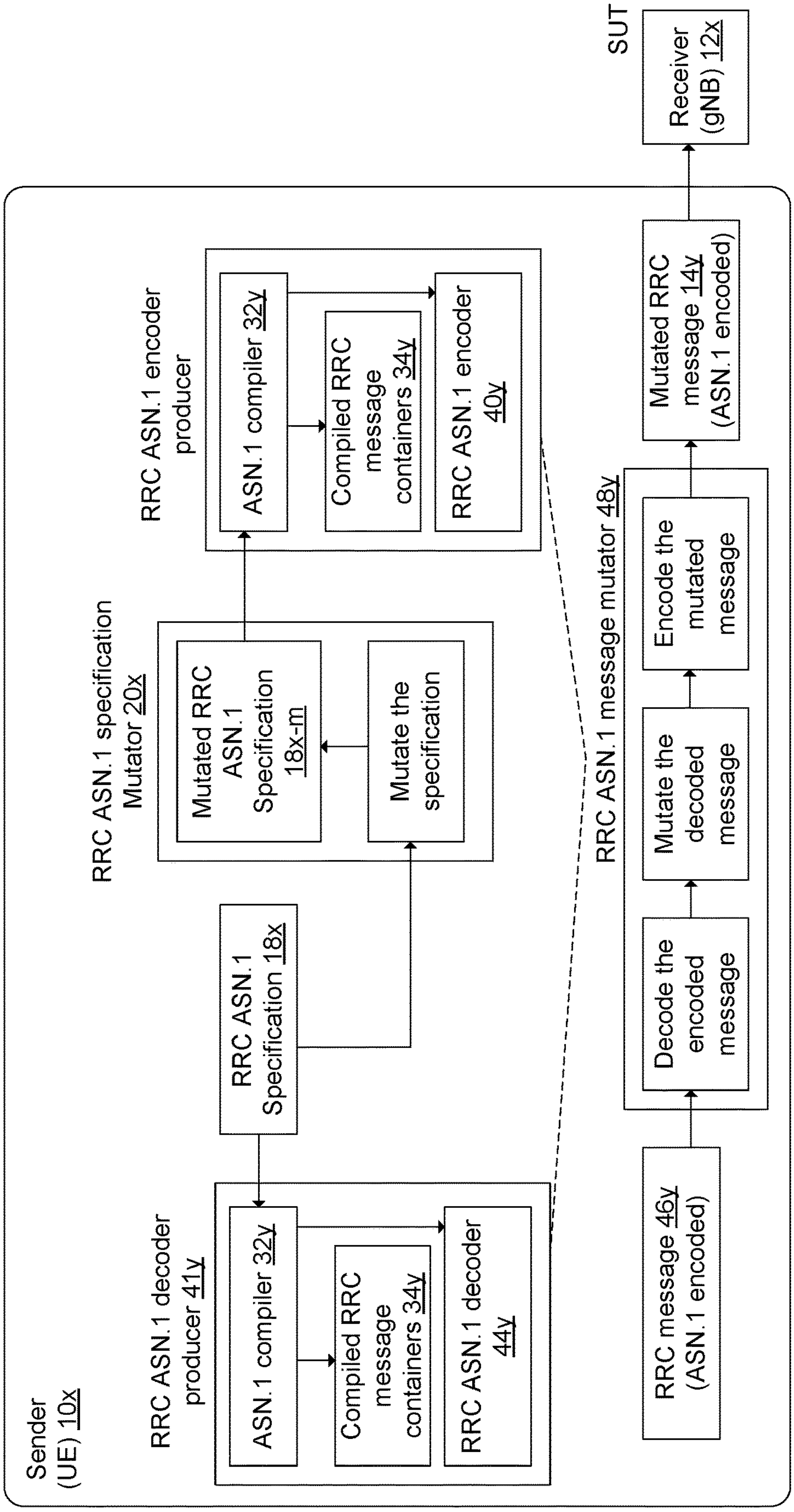
FIG. 8 is a block diagram that shows additional details of mutation-based fuzz testing according to some embodiments where a user equipment (UE) fuzz tests handling by a radio network node of a Radio Resource Control (RRC) ASN.1 specification.

More specifically with reference to FIG. 7 and FIG. 8, the original RRC ASN.1 specification 18*x* is compiled by an RRC ASN.1 decoder producer 41*y* to produce an RRC ASN.1 decoder 44*y* which is conformant to the constrains in the original RRC ASN.1 specification 18*x*. The RRC message mutator 48*y* uses this RRC ASN.1 decoder 44*y* to decode the existing RRC message 46*y*. Further, the RRC ASN.1 specification mutator 20*x* mutates the original RRC ASN.1 specification 18*x* to get rid of constraints or limitations on the fuzzer, examples of which are same as described earlier. The mutated RRC ASN.1 specification 18*x-m* is then compiled by the RRC ASN.1 encoder producer 41*y* to produce RRC ASN.1 encoder 40*y*. Since the ASN.1 compiler 32*y* uses the mutated RRC ASN.1 specification 18*x-m*, the produced RRC ASN.1 encoder 40*y* does not have constrains or limitations posed by the original RRC ASN.1 specification 18*x*. Thus, the RRC message mutator 48*y* can freely use values not allowed by the original RRC ASN.1 specification 18*x* when encoding the mutated message. Moreover, direct mutation of the existing RRC message 46*y* (e.g., via bit changes) would be error prone because those bits may not reflect the desired changes when the message would be decoded. But, by decoding the existing RRC message 46*y* first using the original RRC ASN.1 specification 18*x*, and then mutating the decoded RRC message using the mutated RRC ASN.1 specification 18*x-m*, the desired mutation is achieved.

Generally, then, some embodiments herein mutate an IDL specification (e.g., RRC ASN.1 specification) itself to get rid of or relax constraints or limitations on fuzzing. Moreover, the IDL specification in some embodiments may be mutated only for the encoding of a mutated message, whereas the original IDL specification may be used for decoding of an existing message in mutation-based fuzzing. Advantageously, some embodiments thereby free the fuzzer from the constraints that would otherwise be imposed by the original IDL specification, increasing the chance of finding bugs or problems in the SUT 12.

Figure 9:
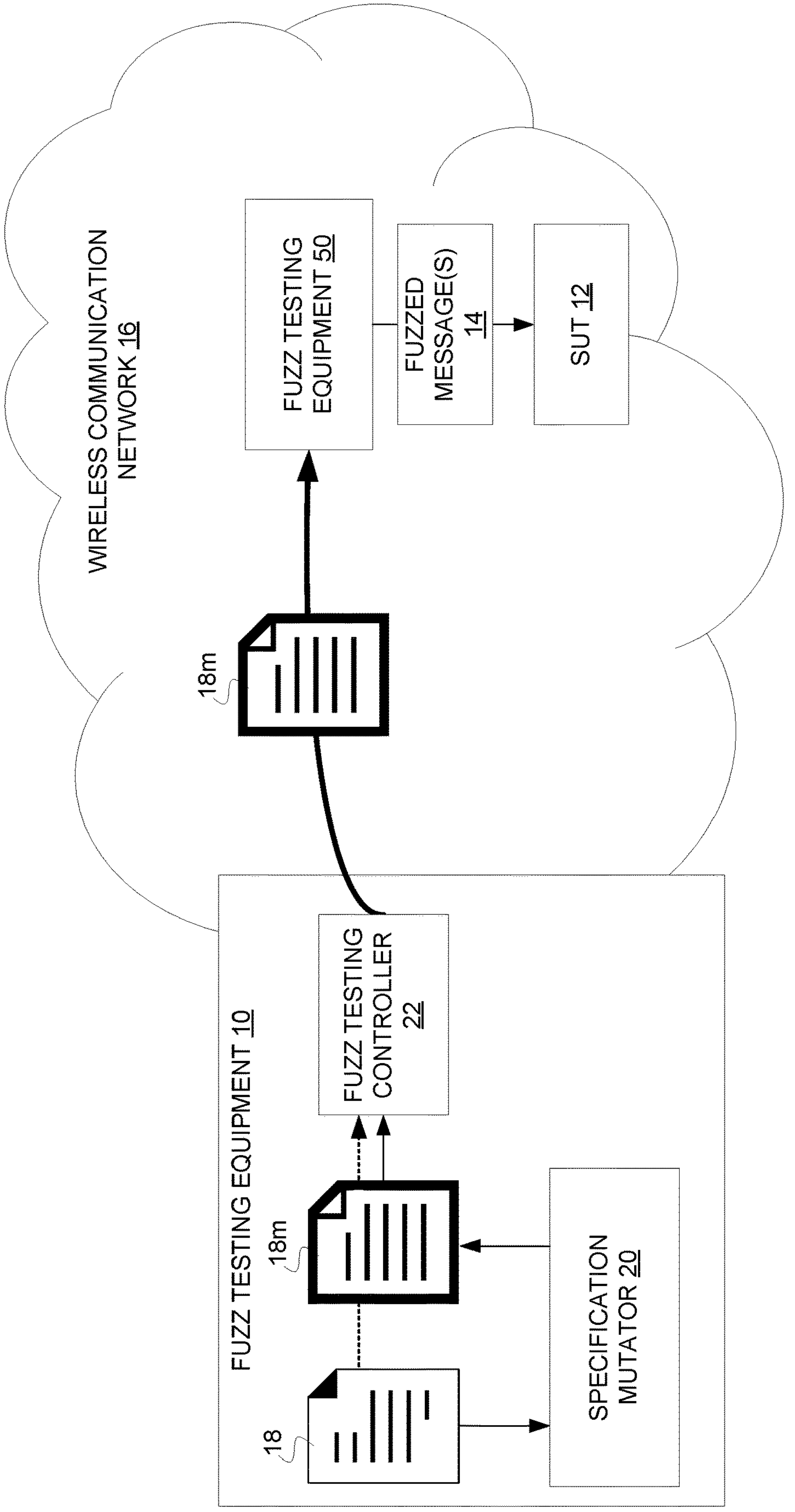
FIG. 9 is a block diagram of fuzz testing equipment that assists other fuzz testing equipment to perform fuzz testing, according to some embodiments.

In some embodiments herein, the fuzz testing equipment 10 not only mutates the message specification 18, but also performs fuzz testing by fuzzing the message(s) 14 and sending the fuzzed message(s) 14 to the SUT 12. In other embodiments, though, the fuzz testing equipment 10 mutates the message specification 18 but merely assists with fuzz testing, i.e., by assisting other fuzz testing equipment (not shown) with actual performance of the fuzz testing. As shown in FIG. 9, for example, the fuzz testing controller 22 assists fuzz testing equipment 50 with performing the fuzz testing of the SUT 12, by sending the mutated message specification 18*m* to fuzz testing equipment 50. The fuzz testing equipment 50 may then fuzz the message(s) 14 based on the mutated message specification 18*m* as described above.

Note that embodiments herein may be implemented in a cloud or virtual environment as an alternative. Alternatively or additionally, in some embodiments, the RRC ASN.1 specification mutator, the RRC message mutator, the RRC message generator, and/or the RRC ASN.1 encoder/decoder may be implemented in software and/or hardware.

Note also that although these examples were illustrated in the context of 5G and the RRC protocol, where ASN.1 is the IDL, the fuzz testing equipment 10 is or represents a UE, and the SUT 12 is a gNB, embodiments herein are equally applicable in other contexts. For example, embodiments herein may be applied to any type of message amenable to fuzz testing, may be applied to any type of wireless communication network (e.g., 2G, 3G, 4G, 5G, or future generations), and/or may be applied to other protocols. Other protocols include for instance NAS between a UE and an Access and Mobility Function (AMF) in 5G, or a next-generation application protocol (NG-AP) between a gNB and AMF.

Nonetheless note in this regard that the RRC layer, i.e., layer 3, offers services and functions such as broadcast of System Information, paging initiated by the 5G Core (5GC) or NG-RAN, maintenance of an RRC connection between the UE and NG-RAN, security functions including key management, maintenance of Signaling Radio Bearers (SRBs) and Data Radio Bearers (DRBs), mobility functions including handover and context transfer, Quality of Service management, UE measurement reporting and control of the reporting, detection of and recovery from radio link failure, and/or Non-Access Stratum (NAS) message transfer between the UE and the AMF. The NAS messages are specified in 3GPP TS 24.501 version 16.5.1.

The RRC messages are specified in 3GPP TS 38.331 version 16.1.0 for gNB and 3GPP TS 36.331 version 16.1.1 for ng-eNB. The contents or message syntax of each RRC message is specified using Abstract Syntax Notation One (ASN.1), which is one of interface description languages.

In other embodiments, the fuzz testing equipment 10 may be or represent a UE, any entity in a radio access network (RAN), or any entity in a core network (CN). The fuzz testing equipment 10 may for instance be or represent entities such as a gNB, ng-eNB, en-gNB, AMF, etc. And, in other embodiments, the SUT 12 may similarly be or represent a UE, any entity in the RAN, or any entity in the CN. The SUT 12 may therefore be or represent entities such as UE, ng-eNB, en-gNB, AMF, or the like.

Similarly, embodiments herein may apply to any IDL. An IDL is used to describe "what" a system is at an abstract level and is agnostic to which programming language is used to produce the actual executable implementation of that IDL. IDLs are generally processed by language specific compilers (or parser or code generators) to produce corresponding data structures that can be use by the specific language, e.g., the same IDL may be compiled into Java and C++ data structures. As such, two different implementations of the same system (e.g., point to point chat application) in different programming languages (e.g., one in Java and another in C++) can communicate with each other even though the actual executables are different. The IDL is also known by other names like interface definition language, data structure definition language, and abstract data description language. Abstract Syntax Notation One (ASN.1) is one IDL, e.g., as specified by X.680-X.693: Information Technology—Abstract Syntax Notation One (ASN.1) & ASN.1 encoding rules. ASN.1 is used in mobile network protocols among others, e.g., RRC messages used between UE and NG-RAN are specified using ASN.1. It is standardized by International Telecommunications Union and there are multiple encoding and decoding standards for ASN.1 messages, e.g., Packed Encoding Rules (PER) and Basic Encoding Rules (BER). Testing and Test Control Notation Version 3 (TTCN-3) can also be considered as an IDL which is specifically designed for testing and certification. It offers abstract definition of test cases that can be compiled for execution. Protocol buffers is yet another IDL that is mainly used for serializing structured data. There are several compilers available for popular programming languages like Java, Python, Objective-C, and C++.

Note further that fuzz testing herein may be implemented at least partly in hardware and/or at least partly in software. Some examples of software fuzzers are American Fuzzy Lop and Radamsa. An SUT may also be called other names like device under test (DUT), equipment under test (EUT), and unit under test (UUT).

Generally, then, some embodiments herein include a method of fuzzing a target message in a mobile network using a message specification. The method comprises mutating the message specification to produce a mutated message specification, generating a message encoder and decoder based on the mutated message specification, and using the message encoder and decoder to fuzz the target message. In some embodiments, the message decoder is generated based on the message specification and/or the message encoder is generated based on the mutated message specification. Alternatively or additionally, in some embodiments, mutating comprises extending allowed values, changing data types, adding or removing fields, and/or renaming fields. In some embodiments, the message specification comprises a specification in an interface description language like ASN.1 or Protocol buffers. In some embodiments, the message is an RRC, NAS, or NG-AP message.

Figure 10:
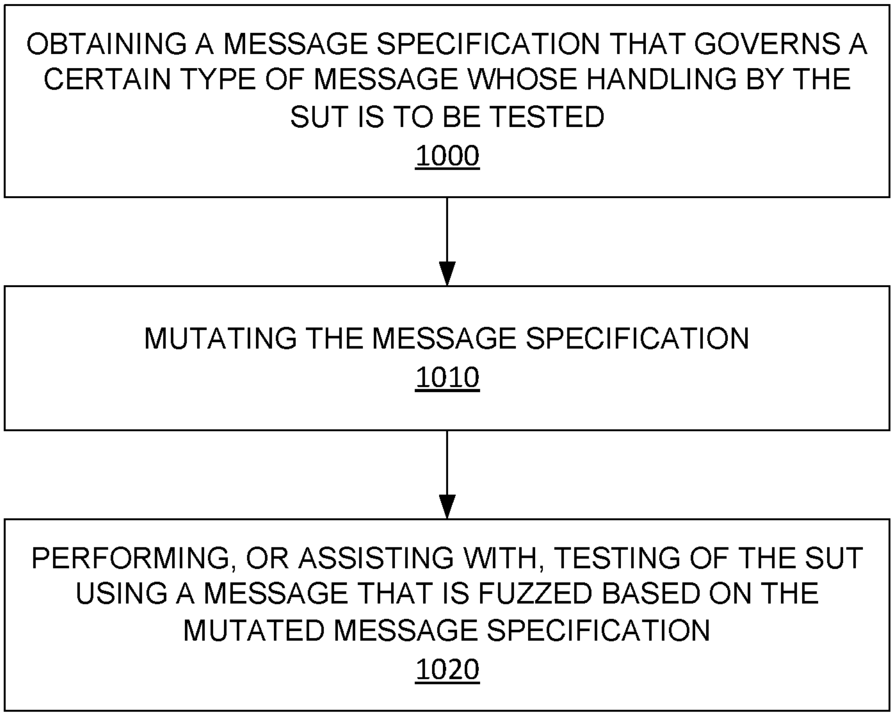
FIG. 10 is a logic flow diagram of a method performed by fuzz testing equipment according to some embodiments.

In view of the modifications and variations herein, FIG. 10 depicts a method performed by fuzz testing equipment 10 for fuzz testing a system under test, SUT, 12 configured for use in a wireless communication network 16 in accordance with particular embodiments. The method includes obtaining a message specification 18 that governs a certain type of message whose handling by the SUT 12 is to be tested (Block 1000). The method also includes mutating the message specification 18 (Block 1010). The method further comprises performing, or assisting with, testing of the SUT 12 using a message 14 that is fuzzed based on the mutated message specification 18*m* (Block 1020).

In some embodiments, the message specification 18 specifies one or more requirements in order for a message to conform to the message specification 18. In this case, mutating the message specification 18 may comprise mutating at least one of the one or more requirements, e.g., by relaxing at least one of the one or more requirements.

For example, in some embodiments, the one or more requirements include a field value requirement. In this case, the field value requirement requires a field of a message of the certain type to have a value included in a set of one or more valid values in order for the message to conform to the message specification 18, and mutating at least one of the one or more requirements comprises relaxing the field value requirement by adding one or more additional valid values to the set of one or more valid values.

As another example, in some embodiments, the one or more requirements include a data type requirement. In this case, the data type requirement requires a field of a message of the certain type to have a certain data type in order for the message to conform to the message specification 18, and mutating at least one of the one or more requirements comprises changing the data type requirement to require the field of the message to have a different data type.

As yet another example, in some embodiments, the one or more requirements include a field name requirement. In this case, the field name requirement requires a field of a message of the certain type to have a certain name in order for the message to conform to the message specification 18, and mutating at least one of the one or more requirements comprises changing the field name requirement to require the field of the message to have a different name.

As still another example, in some embodiments, the one or more requirements include a field value length requirement. In this case, the field value length requirement requires a value of a field of a message of the certain type to have a certain length in order for the message to conform to the message specification 18, and mutating at least one of the one or more requirements comprises changing the field value length requirement to require a value of the field of the message to have a different length.

As another example, in some embodiments, the one or more requirements include a field requirement. In this case, the field requirement requires a message of the certain type to have a set of one or more required fields in order for the message to conform to the message specification 18, and mutating at least one of the one or more requirements comprises adding a required field to the set and/or removing a required field from the set.

Regardless, in some embodiments, performing testing of the SUT 12 comprises fuzzing a message of the certain type based on the mutated message specification 18*m*, and testing the SUT 12 by sending the fuzzed message 14 to the SUT 12. In one or more of these embodiments, fuzzing the message of the certain type based on the mutated message specification 18*m* comprises compiling, based on the mutated message specification 18*m*, a message data structure 34 that defines a data structure of a message conforming to the mutated message specification 18*m*, and obtaining the fuzzed message 14 as a message that has a data structure defined by the compiled message data structure 34. Alternatively or additionally, in some embodiments, the message specification 18 and the mutated message specification 18*m* are each specified in terms of an interface description language which is programming language agnostic, and the compiled message data structure defines a programming language specific data structure of a message conforming to the mutated message specification 18*m*.

In these and other embodiments, obtaining the fuzzed message 14 may comprise generating, from scratch, the fuzzed message as a message that has a data structure defined by the compiled message data structure 34.

Alternatively, the method may further comprise compiling a message decoder 44 based on the message specification 18, and decoding a nominal message 46 using the compiled message decoder 44. In this case, obtaining the fuzzed message 14 comprises obtaining the fuzzed message as a function of the decoded nominal message and the compiled message data structure 34. In one or more of these embodiments, obtaining the fuzzed message 14 comprises copying fields from the decoded nominal message into a fuzzable message that is based on the complied message data structure 34, and obtaining the fuzzed message 14 by fuzzing the fuzzable message.

In some embodiments, the method further comprises compiling a message encoder 40 based on the mutated message specification 18*m*, and encoding the fuzzed message 14 using the compiled message encoder 40. In this case, sending the fuzzed message 14 to the SUT 12 comprises sending the fuzzed message 14 as encoded to the SUT 12.

In some embodiments, assisting with testing of the SUT 12 comprises sending the mutated message specification 18*m* to other fuzz testing equipment 50 configured to test the SUT 12 using a message that is fuzzed based on the mutated message specification 18*m*.

In some embodiments, the message specification 18 is specified in an Interface Description Language, IDL. In one or more of these embodiments, the IDL is Abstract Syntax Notation One, ASN.1.

In some embodiments, the certain type of message is a Radio Resource Control, RRC, message, and the fuzzed message is a fuzzed RRC message. In other embodiments, the certain type of message is a Non-Access Stratum, NAS, message, and the fuzzed message 14 is a fuzzed NAS message.

In some embodiments, the fuzz testing equipment 10 is implemented in a wireless communication device and the SUT 12 is a radio network node. In other embodiments, the fuzz testing equipment 10 is implemented in a radio network node and the SUT 12 is a wireless communication device.

Embodiments herein also include corresponding apparatuses. Embodiments herein for instance include a wireless device configured to perform any of the steps of any of the embodiments described above for the wireless device.

Embodiments also include fuzz testing equipment 10 comprising processing circuitry and power supply circuitry. The processing circuitry is configured to perform any of the steps of any of the embodiments described above for the fuzz testing equipment 10. The power supply circuitry is configured to supply power to the fuzz testing equipment 10.

Embodiments further include fuzz testing equipment 10 comprising processing circuitry. The processing circuitry is configured to perform any of the steps of any of the embodiments described above for the fuzz testing equipment 10. In some embodiments, the fuzz testing equipment 10 further comprises communication circuitry.

Embodiments further include fuzz testing equipment 10 comprising processing circuitry and memory. The memory contains instructions executable by the processing circuitry whereby the fuzz testing equipment 10 is configured to perform any of the steps of any of the embodiments described above for the fuzz testing equipment 10.

More particularly, the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 11:
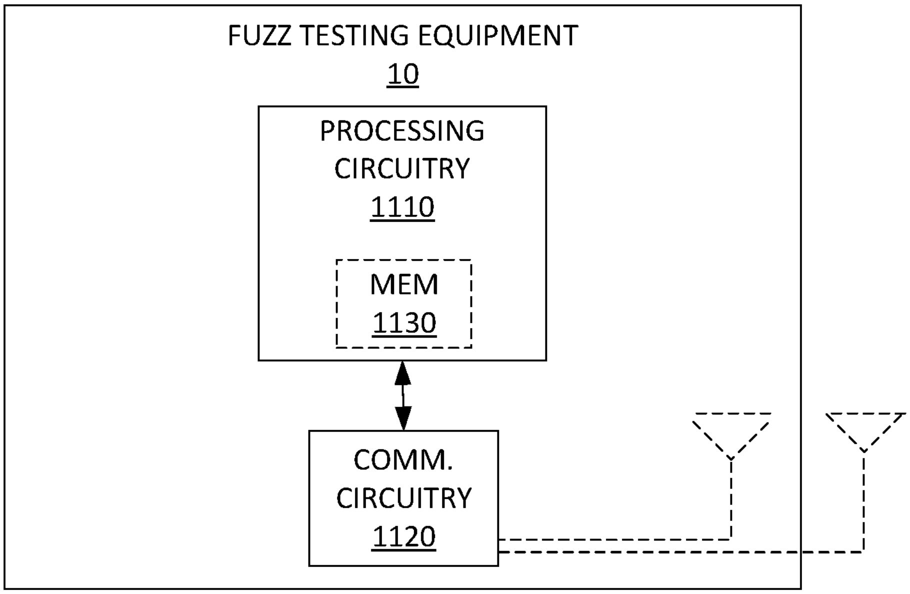
FIG. 11 is a block diagram of fuzz testing equipment according to some embodiments.

FIG. 11 for example illustrates fuzz testing equipment 10 as implemented in accordance with one or more embodiments. In some embodiments, the fuzz testing equipment 10 is a wireless device such as a UE. In other embodiments, the fuzz testing equipment 10 is a radio network node or a core network node. Regardless, as shown, the fuzz testing equipment 10 includes processing circuitry 1110 and communication circuitry 1120. The communication circuitry 1120 (e.g., radio circuitry) is configured to transmit and/or receive information to and/or from one or more other nodes, e.g., via any communication technology. Such communication may occur via one or more antennas that are either internal or external to the fuzz testing equipment 10. The processing circuitry 1110 is configured to perform processing described above, e.g., in FIG. 10, such as by executing instructions stored in memory 1130. The processing circuitry 1110 in this regard may implement certain functional means, units, or modules.

Those skilled in the art will also appreciate that embodiments herein further include corresponding computer programs.

A computer program comprises instructions which, when executed on at least one processor of fuzz testing equipment 10, cause the fuzz testing equipment 10 to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

Figure 12:
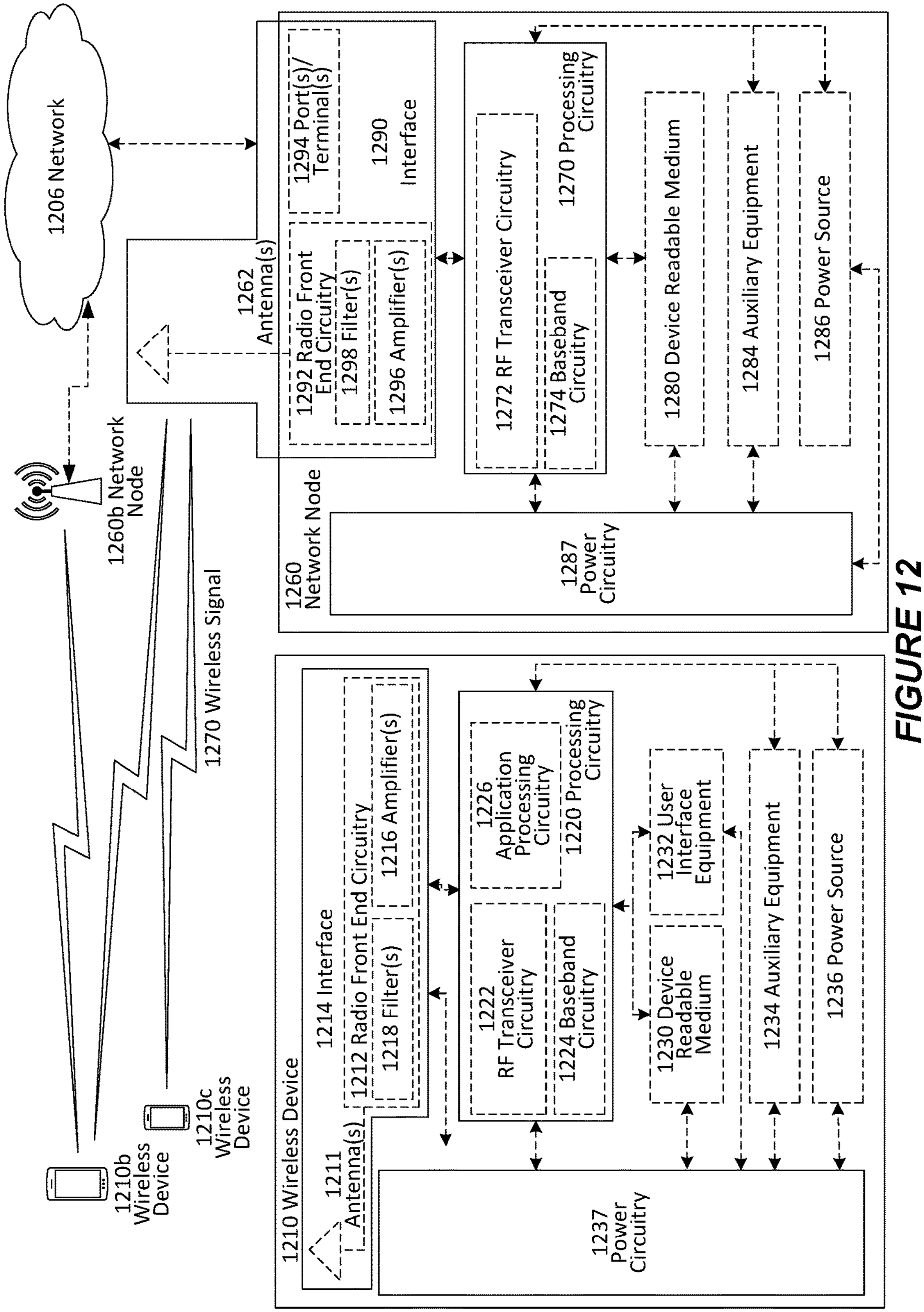
FIG. 12 is a block diagram of a wireless communication network according to some embodiments.

Although the subject matter described herein may be implemented in any appropriate type of system using any suitable components, the embodiments disclosed herein are described in relation to a wireless network, such as the example wireless network illustrated in FIG. 12. For simplicity, the wireless network of FIG. 12 only depicts network 1206, network nodes 1260 and 1260*b*, and WDs 1210, 1210*b*, and 1210*c*. In practice, a wireless network may further include any additional elements suitable to support communication between wireless devices or between a wireless device and another communication device, such as a landline telephone, a service provider, or any other network node or end device. Of the illustrated components, network node 1260 and wireless device (WD) 1210 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1206 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1260 and WD 1210 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 12, network node 1260 includes processing circuitry 1270, device readable medium 1280, interface 1290, auxiliary equipment 1284, power source 1286, power circuitry 1287, and antenna 1262. Although network node 1260 illustrated in the example wireless network of FIG. 12 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1260 are depicted as single boxes located within a larger box, or nested within multiple boxes, in practice, a network node may comprise multiple different physical components that make up a single illustrated component (e.g., device readable medium 1280 may comprise multiple separate hard drives as well as multiple RAM modules).

Similarly, network node 1260 may be composed of multiple physically separate components (e.g., a NodeB component and a RNC component, or a BTS component and a BSC component, etc.), which may each have their own respective components. In certain scenarios in which network node 1260 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1260 may be configured to support multiple radio access technologies (RATs). In such embodiments, some components may be duplicated (e.g., separate device readable medium 1280 for the different RATs) and some components may be reused (e.g., the same antenna 1262 may be shared by the RATs). Network node 1260 may also include multiple sets of the various illustrated components for different wireless technologies integrated into network node 1260, such as, for example, GSM, WCDMA, LTE, NR, WiFi, or Bluetooth wireless technologies. These wireless technologies may be integrated into the same or different chip or set of chips and other components within network node 1260.

Processing circuitry 1270 is configured to perform any determining, calculating, or similar operations (e.g., certain obtaining operations) described herein as being provided by a network node. These operations performed by processing circuitry 1270 may include processing information obtained by processing circuitry 1270 by, for example, converting the obtained information into other information, comparing the obtained information or converted information to information stored in the network node, and/or performing one or more operations based on the obtained information or converted information, and as a result of said processing making a determination.

Processing circuitry 1270 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1260 components, such as device readable medium 1280, network node 1260 functionality. For example, processing circuitry 1270 may execute instructions stored in device readable medium 1280 or in memory within processing circuitry 1270. Such functionality may include providing any of the various wireless features, functions, or benefits discussed herein. In some embodiments, processing circuitry 1270 may include a system on a chip (SOC).

In some embodiments, processing circuitry 1270 may include one or more of radio frequency (RF) transceiver circuitry 1272 and baseband processing circuitry 1274. In some embodiments, radio frequency (RF) transceiver circuitry 1272 and baseband processing circuitry 1274 may be on separate chips (or sets of chips), boards, or units, such as radio units and digital units. In alternative embodiments, part or all of RF transceiver circuitry 1272 and baseband processing circuitry 1274 may be on the same chip or set of chips, boards, or units In certain embodiments, some or all of the functionality described herein as being provided by a network node, base station, eNB or other such network device may be performed by processing circuitry 1270 executing instructions stored on device readable medium 1280 or memory within processing circuitry 1270. In alternative embodiments, some or all of the functionality may be provided by processing circuitry 1270 without executing instructions stored on a separate or discrete device readable medium, such as in a hard-wired manner. In any of those embodiments, whether executing instructions stored on a device readable storage medium or not, processing circuitry 1270 can be configured to perform the described functionality. The benefits provided by such functionality are not limited to processing circuitry 1270 alone or to other components of network node 1260, but are enjoyed by network node 1260 as a whole, and/or by end users and the wireless network generally.

Device readable medium 1280 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1270. Device readable medium 1280 may store any suitable instructions, data or information, including a computer program, software, an application including one or more of logic, rules, code, tables, etc. and/or other instructions capable of being executed by processing circuitry 1270 and, utilized by network node 1260. Device readable medium 1280 may be used to store any calculations made by processing circuitry 1270 and/or any data received via interface 1290. In some embodiments, processing circuitry 1270 and device readable medium 1280 may be considered to be integrated.

Interface 1290 is used in the wired or wireless communication of signalling and/or data between network node 1260, network 1206, and/or WDs 1210. As illustrated, interface 1290 comprises port(s)/terminal(s) 1294 to send and receive data, for example to and from network 1206 over a wired connection. Interface 1290 also includes radio front end circuitry 1292 that may be coupled to, or in certain embodiments a part of, antenna 1262. Radio front end circuitry 1292 comprises filters 1298 and amplifiers 1296. Radio front end circuitry 1292 may be connected to antenna 1262 and processing circuitry 1270. Radio front end circuitry may be configured to condition signals communicated between antenna 1262 and processing circuitry 1270. Radio front end circuitry 1292 may receive digital data that is to be sent out to other network nodes or WDs via a wireless connection. Radio front end circuitry 1292 may convert the digital data into a radio signal having the appropriate channel and bandwidth parameters using a combination of filters 1298 and/or amplifiers 1296. The radio signal may then be transmitted via antenna 1262. Similarly, when receiving data, antenna 1262 may collect radio signals which are then converted into digital data by radio front end circuitry 1292. The digital data may be passed to processing circuitry 1270. In other embodiments, the interface may comprise different components and/or different combinations of components.

In certain alternative embodiments, network node 1260 may not include separate radio front end circuitry 1292, instead, processing circuitry 1270 may comprise radio front end circuitry and may be connected to antenna 1262 without separate radio front end circuitry 1292. Similarly, in some embodiments, all or some of RF transceiver circuitry 1272 may be considered a part of interface 1290. In still other embodiments, interface 1290 may include one or more ports or terminals 1294, radio front end circuitry 1292, and RF transceiver circuitry 1272, as part of a radio unit (not shown), and interface 1290 may communicate with baseband processing circuitry 1274, which is part of a digital unit (not shown).

Antenna 1262 may include one or more antennas, or antenna arrays, configured to send and/or receive wireless signals. Antenna 1262 may be coupled to radio front end circuitry 1290 and may be any type of antenna capable of transmitting and receiving data and/or signals wirelessly. In some embodiments, antenna 1262 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1262 may be separate from network node 1260 and may be connectable to network node 1260 through an interface or port.

Antenna 1262, interface 1290, and/or processing circuitry 1270 may be configured to perform any receiving operations and/or certain obtaining operations described herein as being performed by a network node. Any information, data and/or signals may be received from a wireless device, another network node and/or any other network equipment. Similarly, antenna 1262, interface 1290, and/or processing circuitry 1270 may be configured to perform any transmitting operations described herein as being performed by a network node. Any information, data and/or signals may be transmitted to a wireless device, another network node and/or any other network equipment.

Power circuitry 1287 may comprise, or be coupled to, power management circuitry and is configured to supply the components of network node 1260 with power for performing the functionality described herein. Power circuitry 1287 may receive power from power source 1286. Power source 1286 and/or power circuitry 1287 may be configured to provide power to the various components of network node 1260 in a form suitable for the respective components (e.g., at a voltage and current level needed for each respective component). Power source 1286 may either be included in, or external to, power circuitry 1287 and/or network node 1260. For example, network node 1260 may be connectable to an external power source (e.g., an electricity outlet) via an input circuitry or interface such as an electrical cable, whereby the external power source supplies power to power circuitry 1287. As a further example, power source 1286 may comprise a source of power in the form of a battery or battery pack which is connected to, or integrated in, power circuitry 1287. The battery may provide backup power should the external power source fail. Other types of power sources, such as photovoltaic devices, may also be used.

Alternative embodiments of network node 1260 may include additional components beyond those shown in FIG. 12 that may be responsible for providing certain aspects of the network node's functionality, including any of the functionality described herein and/or any functionality necessary to support the subject matter described herein. For example, network node 1260 may include user interface equipment to allow input of information into network node 1260 and to allow output of information from network node 1260. This may allow a user to perform diagnostic, maintenance, repair, and other administrative functions for network node 1260.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1210 includes antenna 1211, interface 1214, processing circuitry 1220, device readable medium 1230, user interface equipment 1232, auxiliary equipment 1234, power source 1236 and power circuitry 1237. WD 1210 may include multiple sets of one or more of the illustrated components for different wireless technologies supported by WD 1210, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1210. Antenna 1211 may include one or more antennas or antenna arrays, configured to send and/or receive wireless signals, and is connected to interface 1214. In certain alternative embodiments, antenna 1211 may be separate from WD 1210 and be connectable to WD 1210 through an interface or port. Antenna 1211, interface 1214, and/or processing circuitry 1220 may be configured to perform any receiving or transmitting operations described herein as being performed by a WD. Any information, data and/or signals may be received from a network node and/or another WD. In some embodiments, radio front end circuitry and/or antenna 1211 may be considered an interface.

As illustrated, interface 1214 comprises radio front end circuitry 1212 and antenna 1211. Radio front end circuitry 1212 comprise one or more filters 1218 and amplifiers 1216. Radio front end circuitry 1214 is connected to antenna 1211 and processing circuitry 1220, and is configured to condition signals communicated between antenna 1211 and processing circuitry 1220. Radio front end circuitry 1212 may be coupled to or a part of antenna 1211. In some embodiments, WD 1210 may not include separate radio front end circuitry 1212; rather, processing circuitry 1220 may comprise radio front end circuitry and may be connected to antenna 1211. Similarly, in some embodiments, some or all of RF transceiver circuitry 1222 may be considered a part of interface 1214. Radio front end circuitry 1212 may receive digital data that is to be sent out to other network nodes or WDs via a wireless connection. Radio front end circuitry 1212 may convert the digital data into a radio signal having the appropriate channel and bandwidth parameters using a combination of filters 1218 and/or amplifiers 1216. The radio signal may then be transmitted via antenna 1211. Similarly, when receiving data, antenna 1211 may collect radio signals which are then converted into digital data by radio front end circuitry 1212. The digital data may be passed to processing circuitry 1220. In other embodiments, the interface may comprise different components and/or different combinations of components.

Processing circuitry 1220 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1210 components, such as device readable medium 1230, WD 1210 functionality. Such functionality may include providing any of the various wireless features or benefits discussed herein. For example, processing circuitry 1220 may execute instructions stored in device readable medium 1230 or in memory within processing circuitry 1220 to provide the functionality disclosed herein.

As illustrated, processing circuitry 1220 includes one or more of RF transceiver circuitry 1222, baseband processing circuitry 1224, and application processing circuitry 1226. In other embodiments, the processing circuitry may comprise different components and/or different combinations of components. In certain embodiments processing circuitry 1220 of WD 1210 may comprise a SOC. In some embodiments, RF transceiver circuitry 1222, baseband processing circuitry 1224, and application processing circuitry 1226 may be on separate chips or sets of chips. In alternative embodiments, part or all of baseband processing circuitry 1224 and application processing circuitry 1226 may be combined into one chip or set of chips, and RF transceiver circuitry 1222 may be on a separate chip or set of chips. In still alternative embodiments, part or all of RF transceiver circuitry 1222 and baseband processing circuitry 1224 may be on the same chip or set of chips, and application processing circuitry 1226 may be on a separate chip or set of chips. In yet other alternative embodiments, part or all of RF transceiver circuitry 1222, baseband processing circuitry 1224, and application processing circuitry 1226 may be combined in the same chip or set of chips. In some embodiments, RF transceiver circuitry 1222 may be a part of interface 1214. RF transceiver circuitry 1222 may condition RF signals for processing circuitry 1220.

In certain embodiments, some or all of the functionality described herein as being performed by a WD may be provided by processing circuitry 1220 executing instructions stored on device readable medium 1230, which in certain embodiments may be a computer-readable storage medium. In alternative embodiments, some or all of the functionality may be provided by processing circuitry 1220 without executing instructions stored on a separate or discrete device readable storage medium, such as in a hard-wired manner. In any of those particular embodiments, whether executing instructions stored on a device readable storage medium or not, processing circuitry 1220 can be configured to perform the described functionality. The benefits provided by such functionality are not limited to processing circuitry 1220 alone or to other components of WD 1210, but are enjoyed by WD 1210 as a whole, and/or by end users and the wireless network generally.

Processing circuitry 1220 may be configured to perform any determining, calculating, or similar operations (e.g., certain obtaining operations) described herein as being performed by a WD. These operations, as performed by processing circuitry 1220, may include processing information obtained by processing circuitry 1220 by, for example, converting the obtained information into other information, comparing the obtained information or converted information to information stored by WD 1210, and/or performing one or more operations based on the obtained information or converted information, and as a result of said processing making a determination.

Device readable medium 1230 may be operable to store a computer program, software, an application including one or more of logic, rules, code, tables, etc. and/or other instructions capable of being executed by processing circuitry 1220. Device readable medium 1230 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1220. In some embodiments, processing circuitry 1220 and device readable medium 1230 may be considered to be integrated.

User interface equipment 1232 may provide components that allow for a human user to interact with WD 1210. Such interaction may be of many forms, such as visual, audial, tactile, etc. User interface equipment 1232 may be operable to produce output to the user and to allow the user to provide input to WD 1210. The type of interaction may vary depending on the type of user interface equipment 1232 installed in WD 1210. For example, if WD 1210 is a smart phone, the interaction may be via a touch screen; if WD 1210 is a smart meter, the interaction may be through a screen that provides usage (e.g., the number of gallons used) or a speaker that provides an audible alert (e.g., if smoke is detected). User interface equipment 1232 may include input interfaces, devices and circuits, and output interfaces, devices and circuits. User interface equipment 1232 is configured to allow input of information into WD 1210, and is connected to processing circuitry 1220 to allow processing circuitry 1220 to process the input information. User interface equipment 1232 may include, for example, a microphone, a proximity or other sensor, keys/buttons, a touch display, one or more cameras, a USB port, or other input circuitry. User interface equipment 1232 is also configured to allow output of information from WD 1210, and to allow processing circuitry 1220 to output information from WD 1210. User interface equipment 1232 may include, for example, a speaker, a display, vibrating circuitry, a USB port, a headphone interface, or other output circuitry. Using one or more input and output interfaces, devices, and circuits, of user interface equipment 1232, WD 1210 may communicate with end users and/or the wireless network, and allow them to benefit from the functionality described herein.

Auxiliary equipment 1234 is operable to provide more specific functionality which may not be generally performed by WDs. This may comprise specialized sensors for doing measurements for various purposes, interfaces for additional types of communication such as wired communications etc. The inclusion and type of components of auxiliary equipment 1234 may vary depending on the embodiment and/or scenario.

Power source 1236 may, in some embodiments, be in the form of a battery or battery pack. Other types of power sources, such as an external power source (e.g., an electricity outlet), photovoltaic devices or power cells, may also be used. WD 1210 may further comprise power circuitry 1237 for delivering power from power source 1236 to the various parts of WD 1210 which need power from power source 1236 to carry out any functionality described or indicated herein. Power circuitry 1237 may in certain embodiments comprise power management circuitry. Power circuitry 1237 may additionally or alternatively be operable to receive power from an external power source; in which case WD 1210 may be connectable to the external power source (such as an electricity outlet) via input circuitry or an interface such as an electrical power cable. Power circuitry 1237 may also in certain embodiments be operable to deliver power from an external power source to power source 1236. This may be, for example, for the charging of power source 1236. Power circuitry 1237 may perform any formatting, converting, or other modification to the power from power source 1236 to make the power suitable for the respective components of WD 1210 to which power is supplied.

Figure 13:
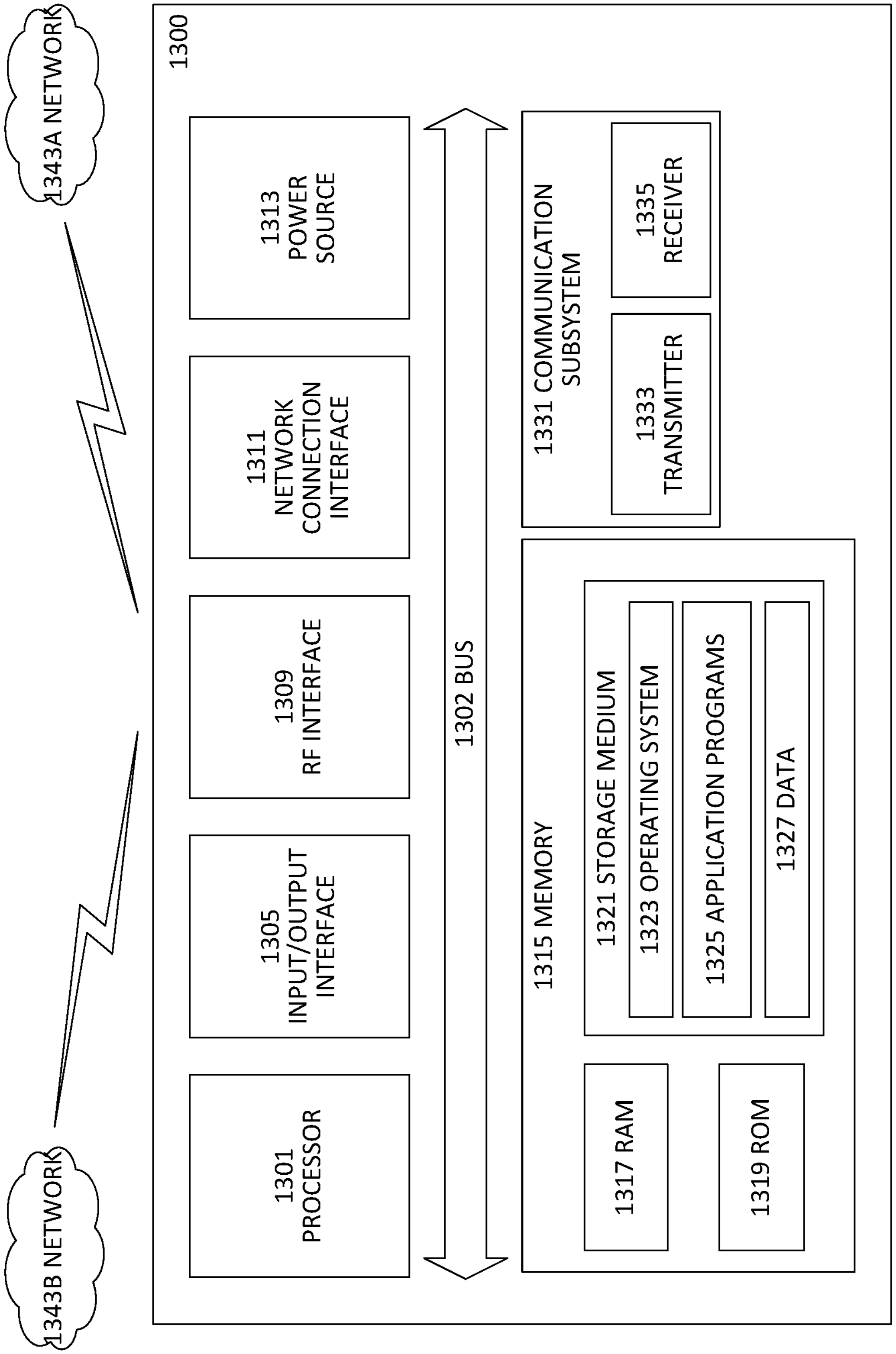
FIG. 13 is a block diagram of a user equipment according to some embodiments.

FIG. 13 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 13200 may be any UE identified by the 3$^{rd}$ Generation Partnership Project (3GPP), including a NB-IoT UE, a machine type communication (MTC) UE, and/or an enhanced MTC (eMTC) UE. UE 1300, as illustrated in FIG. 13, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE may be used interchangeable. Accordingly, although FIG. 13 is a UE, the components discussed herein are equally applicable to a WD, and vice-versa.

In FIG. 13, UE 1300 includes processing circuitry 1301 that is operatively coupled to input/output interface 1305, radio frequency (RF) interface 1309, network connection interface 1311, memory 1315 including random access memory (RAM) 1317, read-only memory (ROM) 1319, and storage medium 1321 or the like, communication subsystem 1331, power source 1333, and/or any other component, or any combination thereof. Storage medium 1321 includes operating system 1323, application program 1325, and data 1327. In other embodiments, storage medium 1321 may include other similar types of information. Certain UEs may utilize all of the components shown in FIG. 13, or only a subset of the components. The level of integration between the components may vary from one UE to another UE. Further, certain UEs may contain multiple instances of a component, such as multiple processors, memories, transceivers, transmitters, receivers, etc.

In FIG. 13, processing circuitry 1301 may be configured to process computer instructions and data. Processing circuitry 1301 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1301 may include two central processing units (CPUs). Data may be information in a form suitable for use by a computer.

In the depicted embodiment, input/output interface 1305 may be configured to provide a communication interface to an input device, output device, or input and output device. UE 1300 may be configured to use an output device via input/output interface 1305. An output device may use the same type of interface port as an input device. For example, a USB port may be used to provide input to and output from UE 1300. The output device may be a speaker, a sound card, a video card, a display, a monitor, a printer, an actuator, an emitter, a smartcard, another output device, or any combination thereof. UE 1300 may be configured to use an input device via input/output interface 1305 to allow a user to capture information into UE 1300. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 13, RF interface 1309 may be configured to provide a communication interface to RF components such as a transmitter, a receiver, and an antenna. Network connection interface 1311 may be configured to provide a communication interface to network 1343*a*. Network 1343*a* may encompass wired and/or wireless networks such as a local-area network (LAN), a wide-area network (WAN), a computer network, a wireless network, a telecommunications network, another like network or any combination thereof. For example, network 1343*a* may comprise a Wi-Fi network. Network connection interface 1311 may be configured to include a receiver and a transmitter interface used to communicate with one or more other devices over a communication network according to one or more communication protocols, such as Ethernet, TCP/IP, SONET, ATM, or the like. Network connection interface 1311 may implement receiver and transmitter functionality appropriate to the communication network links (e.g., optical, electrical, and the like). The transmitter and receiver functions may share circuit components, software or firmware, or alternatively may be implemented separately.

RAM 1317 may be configured to interface via bus 1302 to processing circuitry 1301 to provide storage or caching of data or computer instructions during the execution of software programs such as the operating system, application programs, and device drivers. ROM 1319 may be configured to provide computer instructions or data to processing circuitry 1301. For example, ROM 1319 may be configured to store invariant low-level system code or data for basic system functions such as basic input and output (I/O), startup, or reception of keystrokes from a keyboard that are stored in a non-volatile memory. Storage medium 1321 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1321 may be configured to include operating system 1323, application program 1325 such as a web browser application, a widget or gadget engine or another application, and data file 1327. Storage medium 1321 may store, for use by UE 1300, any of a variety of various operating systems or combinations of operating systems.

Storage medium 1321 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1321 may allow UE 1300 to access computer-executable instructions, application programs or the like, stored on transitory or non-transitory memory media, to off-load data, or to upload data. An article of manufacture, such as one utilizing a communication system may be tangibly embodied in storage medium 1321, which may comprise a device readable medium.

In FIG. 13, processing circuitry 1301 may be configured to communicate with network 1343*b* using communication subsystem 1331. Network 1343*a* and network 1343*b* may be the same network or networks or different network or networks. Communication subsystem 1331 may be configured to include one or more transceivers used to communicate with network 1343*b*. For example, communication subsystem 1331 may be configured to include one or more transceivers used to communicate with one or more remote transceivers of another device capable of wireless communication such as another WD, UE, or base station of a radio access network (RAN) according to one or more communication protocols, such as IEEE 802.13, CDMA, WCDMA, GSM, LTE, UTRAN, WiMax, or the like. Each transceiver may include transmitter 1333 and/or receiver 1335 to implement transmitter or receiver functionality, respectively, appropriate to the RAN links (e.g., frequency allocations and the like). Further, transmitter 1333 and receiver 1335 of each transceiver may share circuit components, software or firmware, or alternatively may be implemented separately.

In the illustrated embodiment, the communication functions of communication subsystem 1331 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1331 may include cellular communication, Wi-Fi communication, Bluetooth communication, and GPS communication. Network 1343*b* may encompass wired and/or wireless networks such as a local-area network (LAN), a wide-area network (WAN), a computer network, a wireless network, a telecommunications network, another like network or any combination thereof. For example, network 1343*b* may be a cellular network, a Wi-Fi network, and/or a near-field network. Power source 1313 may be configured to provide alternating current (AC) or direct current (DC) power to components of UE 1300.

The features, benefits and/or functions described herein may be implemented in one of the components of UE 1300 or partitioned across multiple components of UE 1300. Further, the features, benefits, and/or functions described herein may be implemented in any combination of hardware, software or firmware. In one example, communication subsystem 1331 may be configured to include any of the components described herein. Further, processing circuitry 1301 may be configured to communicate with any of such components over bus 1302. In another example, any of such components may be represented by program instructions stored in memory that when executed by processing circuitry 1301 perform the corresponding functions described herein. In another example, the functionality of any of such components may be partitioned between processing circuitry 1301 and communication subsystem 1331. In another example, the non-computationally intensive functions of any of such components may be implemented in software or firmware and the computationally intensive functions may be implemented in hardware.

Figure 14:
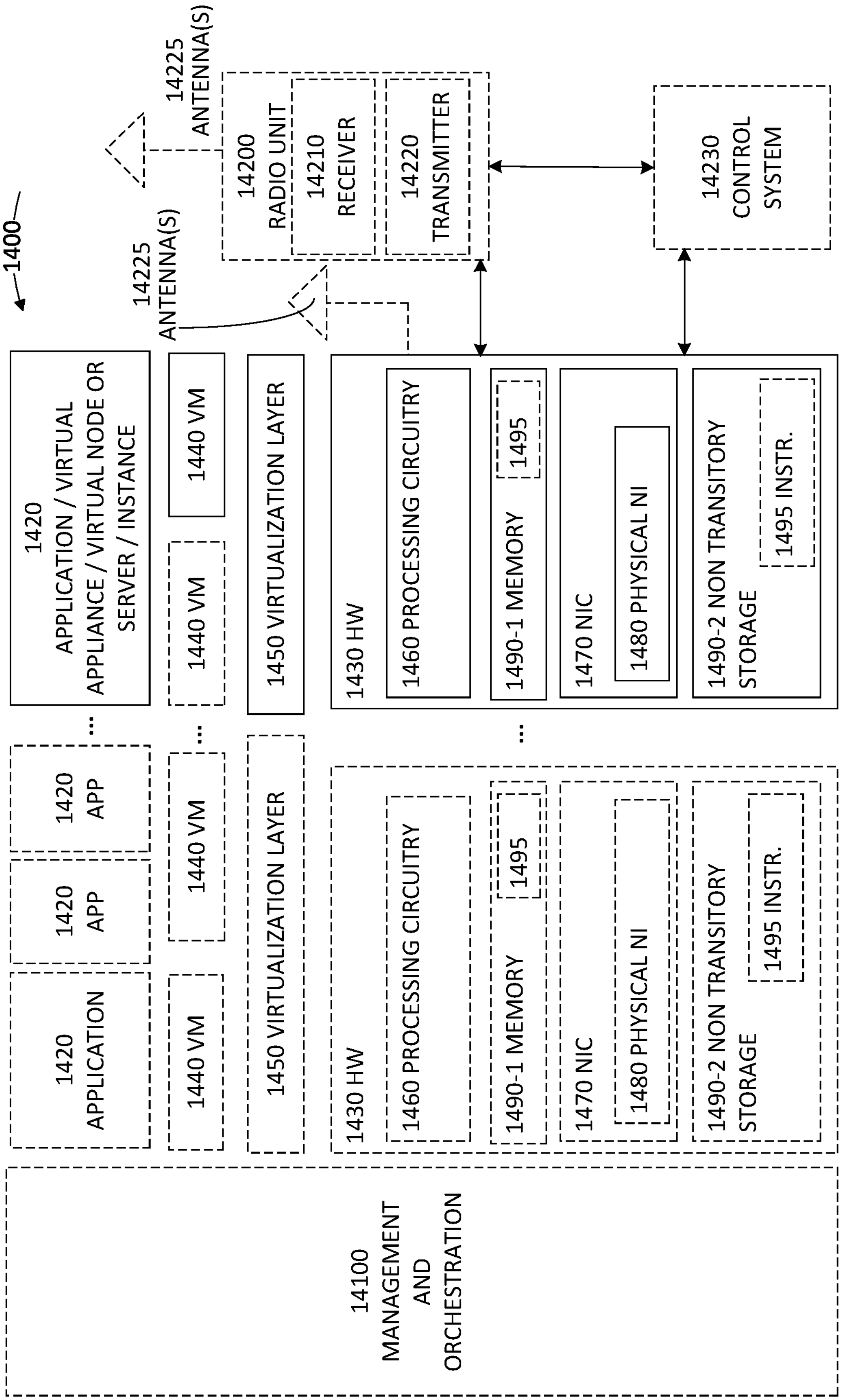
FIG. 14 is a block diagram of a virtualization environment according to some embodiments.

FIG. 14 is a schematic block diagram illustrating a virtualization environment 1400 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1400 hosted by one or more of hardware nodes 1430. Further, in embodiments in which the virtual node is not a radio access node or does not require radio connectivity (e.g., a core network node), then the network node may be entirely virtualized.

The functions may be implemented by one or more applications 1420 (which may alternatively be called software instances, virtual appliances, network functions, virtual nodes, virtual network functions, etc.) operative to implement some of the features, functions, and/or benefits of some of the embodiments disclosed herein. Applications 1420 are run in virtualization environment 1400 which provides hardware 1430 comprising processing circuitry 1460 and memory 1490. Memory 1490 contains instructions 1495 executable by processing circuitry 1460 whereby application 1420 is operative to provide one or more of the features, benefits, and/or functions disclosed herein.

Virtualization environment 1400, comprises general-purpose or special-purpose network hardware devices 1430 comprising a set of one or more processors or processing circuitry 1460, which may be commercial off-the-shelf (COTS) processors, dedicated Application Specific Integrated Circuits (ASICs), or any other type of processing circuitry including digital or analog hardware components or special purpose processors. Each hardware device may comprise memory 1490-1 which may be non-persistent memory for temporarily storing instructions 1495 or software executed by processing circuitry 1460. Each hardware device may comprise one or more network interface controllers (NICs) 1470, also known as network interface cards, which include physical network interface 1480. Each hardware device may also include non-transitory, persistent, machine-readable storage media 1490-2 having stored therein software 1495 and/or instructions executable by processing circuitry 1460. Software 1495 may include any type of software including software for instantiating one or more virtualization layers 1450 (also referred to as hypervisors), software to execute virtual machines 1440 as well as software allowing it to execute functions, features and/or benefits described in relation with some embodiments described herein.

Virtual machines 1440, comprise virtual processing, virtual memory, virtual networking or interface and virtual storage, and may be run by a corresponding virtualization layer 1450 or hypervisor. Different embodiments of the instance of virtual appliance 1420 may be implemented on one or more of virtual machines 1440, and the implementations may be made in different ways.

During operation, processing circuitry 1460 executes software 1495 to instantiate the hypervisor or virtualization layer 1450, which may sometimes be referred to as a virtual machine monitor (VMM). Virtualization layer 1450 may present a virtual operating platform that appears like networking hardware to virtual machine 1440.

As shown in FIG. 14, hardware 1430 may be a standalone network node with generic or specific components. Hardware 1430 may comprise antenna 14225 and may implement some functions via virtualization. Alternatively, hardware 1430 may be part of a larger cluster of hardware (e.g. such as in a data center or customer premise equipment (CPE)) where many hardware nodes work together and are managed via management and orchestration (MANO) 14100, which, among others, oversees lifecycle management of applications 1420.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1440 may be a software implementation of a physical machine that runs programs as if they were executing on a physical, non-virtualized machine. Each of virtual machines 1440, and that part of hardware 1430 that executes that virtual machine, be it hardware dedicated to that virtual machine and/or hardware shared by that virtual machine with others of the virtual machines 1440, forms a separate virtual network elements (VNE).

Still in the context of NFV, Virtual Network Function (VNF) is responsible for handling specific network functions that run in one or more virtual machines 1440 on top of hardware networking infrastructure 1430 and corresponds to application 1420 in FIG. 14.

In some embodiments, one or more radio units 14200 that each include one or more transmitters 14220 and one or more receivers 14210 may be coupled to one or more antennas 14225. Radio units 14200 may communicate directly with hardware nodes 1430 via one or more appropriate network interfaces and may be used in combination with the virtual components to provide a virtual node with radio capabilities, such as a radio access node or a base station.

In some embodiments, some signalling can be effected with the use of control system 14230 which may alternatively be used for communication between the hardware nodes 1430 and radio units 14200.

Figure 15:
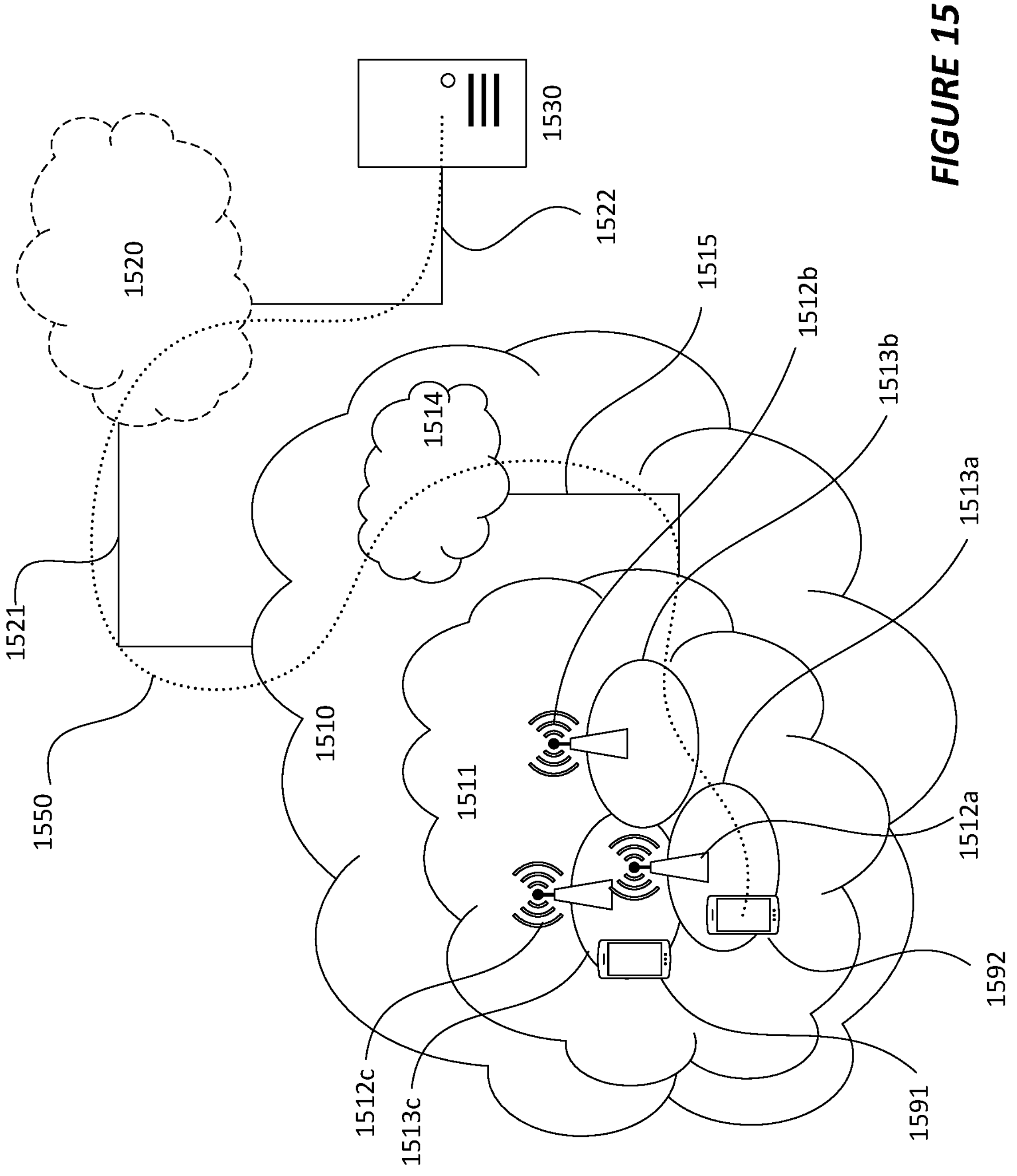
FIG. 15 is a block diagram of a communication network with a host computer according to some embodiments.

FIG. 15 illustrates a telecommunication network connected via an intermediate network to a host computer in accordance with some embodiments. In particular, with reference to FIG. 15, in accordance with an embodiment, a communication system includes telecommunication network 1510, such as a 3GPP-type cellular network, which comprises access network 1511, such as a radio access network, and core network 1514. Access network 1511 comprises a plurality of base stations **1512*a*, 1512*b*, 1512*c*, such as NBs, eNBs, gNBs or other types of wireless access points, each defining a corresponding coverage area 1513*a*, 1513*b*, 1513*c*. Each base station 1512*a*, 1512*b*, 1512*c* is connectable to core network 1514 over a wired or wireless connection 1515. A first UE 1591 located in coverage area 1513*c* is configured to wirelessly connect to, or be paged by, the corresponding base station 1512*c*. A second UE 1592 in coverage area 1513*a* is wirelessly connectable to the corresponding base station 1512*a*. While a plurality of UEs 1591, 1592 are illustrated in this example, the disclosed embodiments are equally applicable to a situation where a sole UE is in the coverage area or where a sole UE is connecting to the corresponding base station 1512**.

Telecommunication network 1510 is itself connected to host computer 1530, which may be embodied in the hardware and/or software of a standalone server, a cloud-implemented server, a distributed server or as processing resources in a server farm. Host computer 1530 may be under the ownership or control of a service provider, or may be operated by the service provider or on behalf of the service provider. Connections 1521 and 1522 between telecommunication network 1510 and host computer 1530 may extend directly from core network 1514 to host computer 1530 or may go via an optional intermediate network 1520. Intermediate network 1520 may be one of, or a combination of more than one of, a public, private or hosted network; intermediate network 1520, if any, may be a backbone network or the Internet; in particular, intermediate network 1520 may comprise two or more sub-networks (not shown).

The communication system of FIG. 15 as a whole enables connectivity between the connected UEs 1591, 1592 and host computer 1530. The connectivity may be described as an over-the-top (OTT) connection 1550. Host computer 1530 and the connected UEs 1591, 1592 are configured to communicate data and/or signaling via OTT connection 1550, using access network 1511, core network 1514, any intermediate network 1520 and possible further infrastructure (not shown) as intermediaries. OTT connection 1550 may be transparent in the sense that the participating communication devices through which OTT connection 1550 passes are unaware of routing of uplink and downlink communications. For example, base station 1512 may not or need not be informed about the past routing of an incoming downlink communication with data originating from host computer 1530 to be forwarded (e.g., handed over) to a connected UE 1591. Similarly, base station 1512 need not be aware of the future routing of an outgoing uplink communication originating from the UE 1591 towards the host computer 1530.

Figure 16:
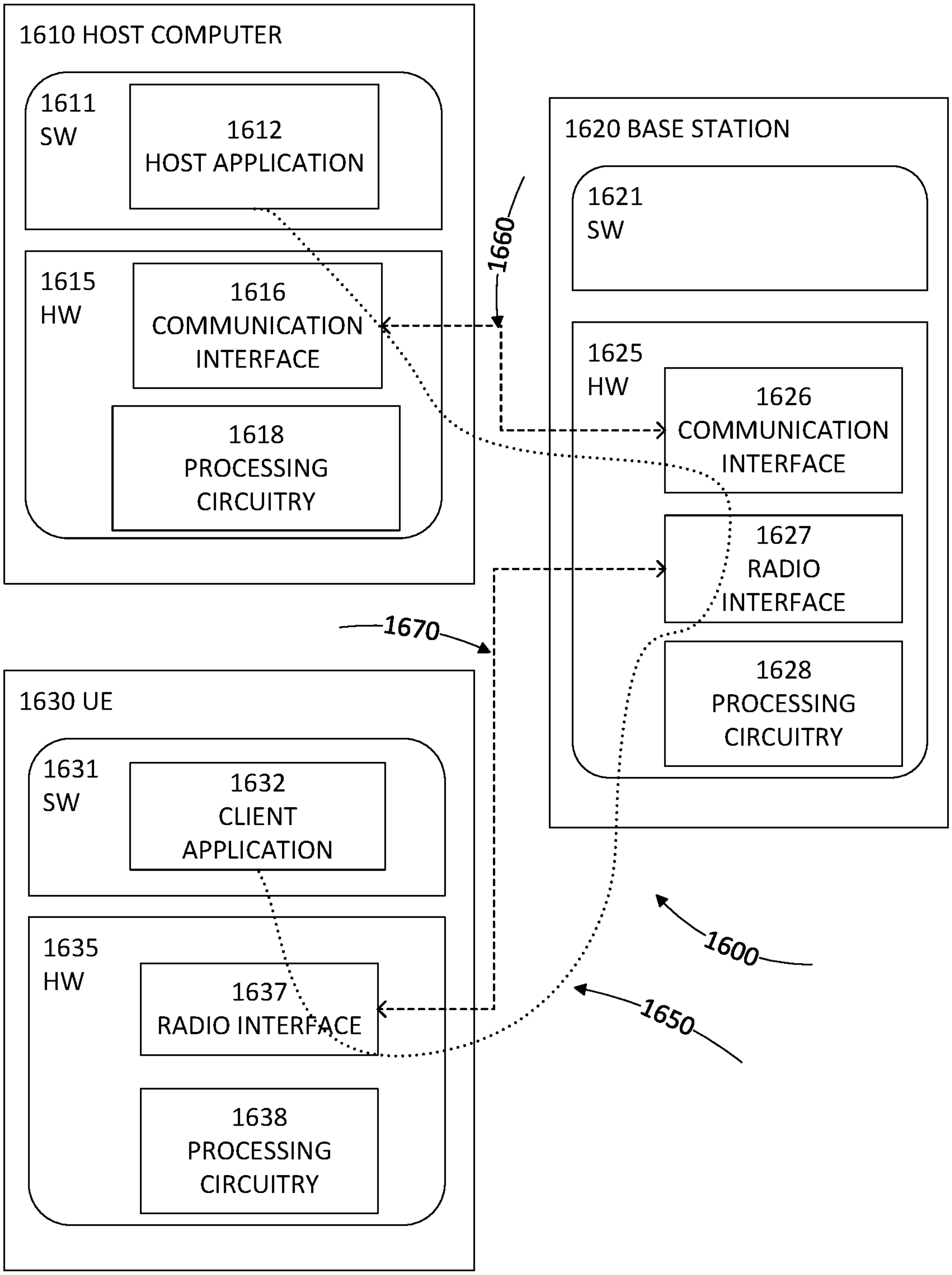
FIG. 16 is a block diagram of a host computer according to some embodiments.

Example implementations, in accordance with an embodiment, of the UE, base station and host computer discussed in the preceding paragraphs will now be described with reference to FIG. 16. FIG. 16 illustrates host computer communicating via a base station with a user equipment over a partially wireless connection in accordance with some embodiments In communication system 1600, host computer 1610 comprises hardware 1615 including communication interface 1616 configured to set up and maintain a wired or wireless connection with an interface of a different communication device of communication system 1600. Host computer 1610 further comprises processing circuitry 1618, which may have storage and/or processing capabilities. In particular, processing circuitry 1618 may comprise one or more programmable processors, application-specific integrated circuits, field programmable gate arrays or combinations of these (not shown) adapted to execute instructions. Host computer 1610 further comprises software 1611, which is stored in or accessible by host computer 1610 and executable by processing circuitry 1618. Software 1611 includes host application 1612. Host application 1612 may be operable to provide a service to a remote user, such as UE 1630 connecting via OTT connection 1650 terminating at UE 1630 and host computer 1610. In providing the service to the remote user, host application 1612 may provide user data which is transmitted using OTT connection 1650.

Communication system 1600 further includes base station 1620 provided in a telecommunication system and comprising hardware 1625 enabling it to communicate with host computer 1610 and with UE 1630. Hardware 1625 may include communication interface 1626 for setting up and maintaining a wired or wireless connection with an interface of a different communication device of communication system 1600, as well as radio interface 1627 for setting up and maintaining at least wireless connection 1670 with UE 1630 located in a coverage area (not shown in FIG. 16) served by base station 1620. Communication interface 1626 may be configured to facilitate connection 1660 to host computer 1610. Connection 1660 may be direct or it may pass through a core network (not shown in FIG. 16) of the telecommunication system and/or through one or more intermediate networks outside the telecommunication system. In the embodiment shown, hardware 1625 of base station 1620 further includes processing circuitry 1628, which may comprise one or more programmable processors, application-specific integrated circuits, field programmable gate arrays or combinations of these (not shown) adapted to execute instructions. Base station 1620 further has software 1621 stored internally or accessible via an external connection.

Communication system 1600 further includes UE 1630 already referred to. Its hardware 1635 may include radio interface 1637 configured to set up and maintain wireless connection 1670 with a base station serving a coverage area in which UE 1630 is currently located. Hardware 1635 of UE 1630 further includes processing circuitry 1638, which may comprise one or more programmable processors, application-specific integrated circuits, field programmable gate arrays or combinations of these (not shown) adapted to execute instructions. UE 1630 further comprises software 1631, which is stored in or accessible by UE 1630 and executable by processing circuitry 1638. Software 1631 includes client application 1632. Client application 1632 may be operable to provide a service to a human or non-human user via UE 1630, with the support of host computer 1610. In host computer 1610, an executing host application 1612 may communicate with the executing client application 1632 via OTT connection 1650 terminating at UE 1630 and host computer 1610. In providing the service to the user, client application 1632 may receive request data from host application 1612 and provide user data in response to the request data. OTT connection 1650 may transfer both the request data and the user data. Client application 1632 may interact with the user to generate the user data that it provides.

It is noted that host computer 1610, base station 1620 and UE 1630 illustrated in FIG. 16 may be similar or identical to host computer 1530, one of base stations 1512*a*, 1512*b*, 1512*c* and one of UEs 1591, 1592 of FIG. 15, respectively. This is to say, the inner workings of these entities may be as shown in FIG. 16 and independently, the surrounding network topology may be that of FIG. 15.

In FIG. 16, OTT connection 1650 has been drawn abstractly to illustrate the communication between host computer 1610 and UE 1630 via base station 1620, without explicit reference to any intermediary devices and the precise routing of messages via these devices. Network infrastructure may determine the routing, which it may be configured to hide from UE 1630 or from the service provider operating host computer 1610, or both. While OTT connection 1650 is active, the network infrastructure may further take decisions by which it dynamically changes the routing (e.g., on the basis of load balancing consideration or reconfiguration of the network).

Wireless connection 1670 between UE 1630 and base station 1620 is in accordance with the teachings of the embodiments described throughout this disclosure. One or more of the various embodiments improve the performance of OTT services provided to UE 1630 using OTT connection 1650, in which wireless connection 1670 forms the last segment.

A measurement procedure may be provided for the purpose of monitoring data rate, latency and other factors on which the one or more embodiments improve. There may further be an optional network functionality for reconfiguring OTT connection 1650 between host computer 1610 and UE 1630, in response to variations in the measurement results. The measurement procedure and/or the network functionality for reconfiguring OTT connection 1650 may be implemented in software 1611 and hardware 1615 of host computer 1610 or in software 1631 and hardware 1635 of UE 1630, or both. In embodiments, sensors (not shown) may be deployed in or in association with communication devices through which OTT connection 1650 passes; the sensors may participate in the measurement procedure by supplying values of the monitored quantities exemplified above, or supplying values of other physical quantities from which software 1611, 1631 may compute or estimate the monitored quantities. The reconfiguring of OTT connection 1650 may include message format, retransmission settings, preferred routing etc.; the reconfiguring need not affect base station 1620, and it may be unknown or imperceptible to base station 1620. Such procedures and functionalities may be known and practiced in the art. In certain embodiments, measurements may involve proprietary UE signaling facilitating host computer 1610's measurements of throughput, propagation times, latency and the like. The measurements may be implemented in that software 1611 and 1631 causes messages to be transmitted, in particular empty or 'dummy' messages, using OTT connection 1650 while it monitors propagation times, errors etc.

Figure 17:
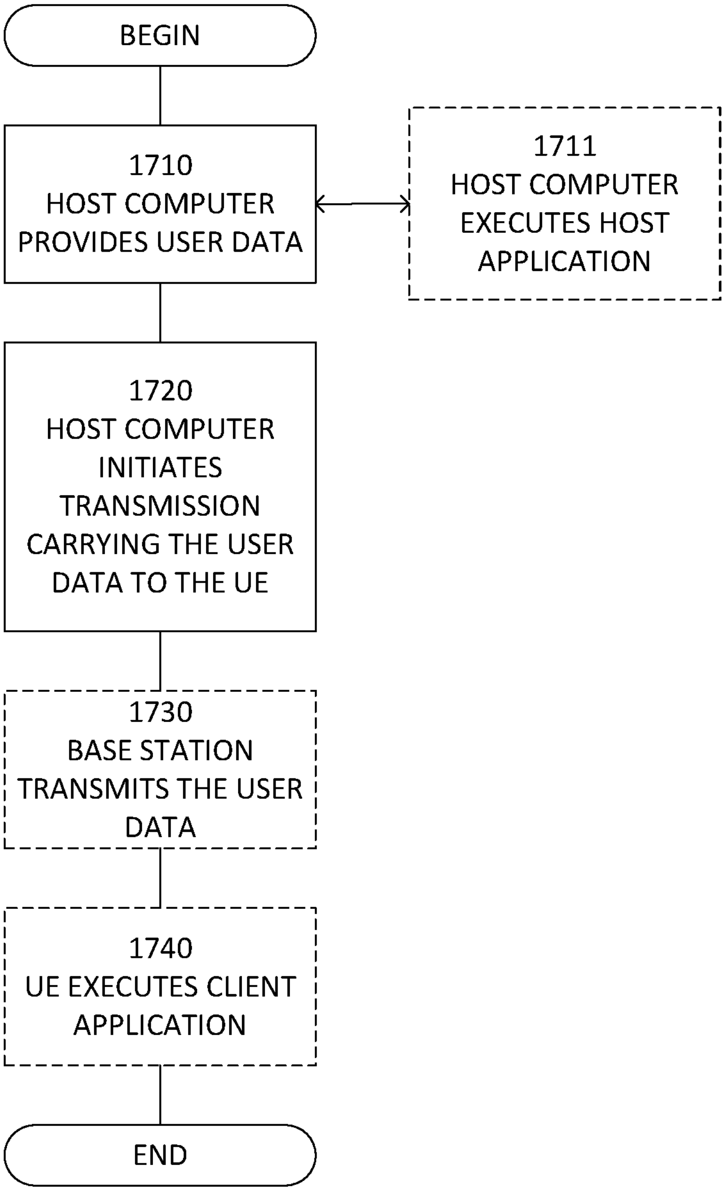
FIG. 17 is a flowchart illustrating a method implemented in a communication system, in accordance with one embodiment.

FIG. 17 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 17 will be included in this section. In step 1710, the host computer provides user data. In substep 1711 (which may be optional) of step 1710, the host computer provides the user data by executing a host application. In step 1720, the host computer initiates a transmission carrying the user data to the UE. In step 1730 (which may be optional), the base station transmits to the UE the user data which was carried in the transmission that the host computer initiated, in accordance with the teachings of the embodiments described throughout this disclosure. In step 1740 (which may also be optional), the UE executes a client application associated with the host application executed by the host computer.

Figure 18:
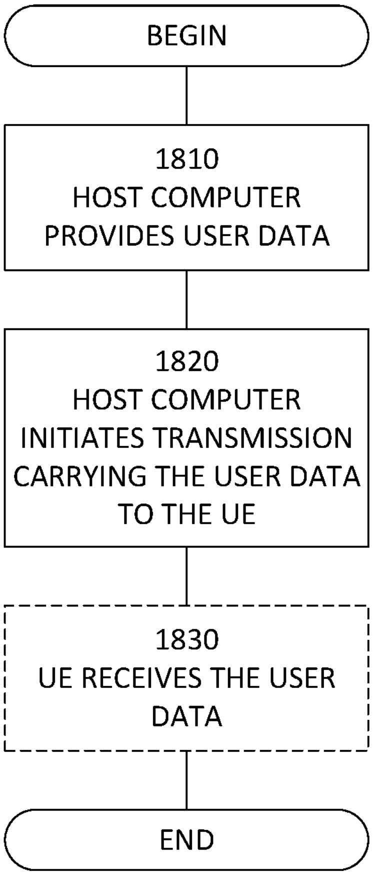
FIG. 18 is a flowchart illustrating a method implemented in a communication system, in accordance with one embodiment.

FIG. 18 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 18 will be included in this section. In step 1810 of the method, the host computer provides user data. In an optional substep (not shown) the host computer provides the user data by executing a host application. In step 1820, the host computer initiates a transmission carrying the user data to the UE. The transmission may pass via the base station, in accordance with the teachings of the embodiments described throughout this disclosure. In step 1830 (which may be optional), the UE receives the user data carried in the transmission.

Figure 19:
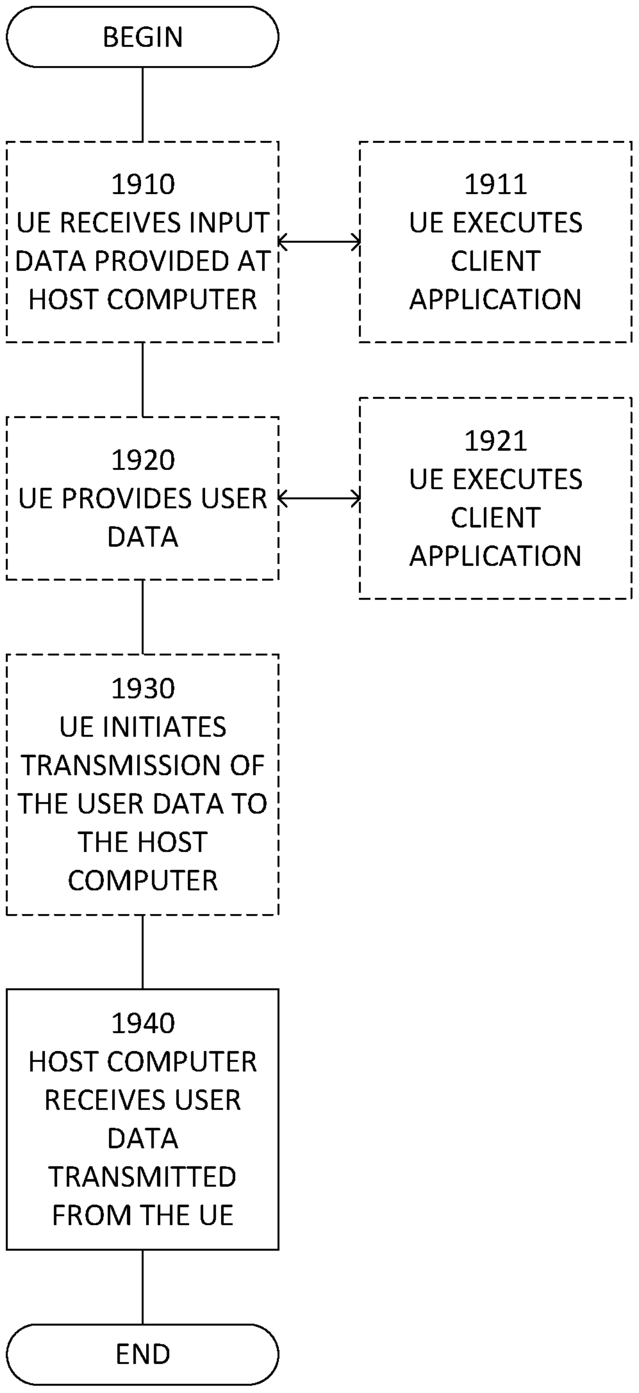
FIG. 19 is a flowchart illustrating a method implemented in a communication system, in accordance with one embodiment.

FIG. 19 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 19 will be included in this section. In step 1910 (which may be optional), the UE receives input data provided by the host computer. Additionally or alternatively, in step 1920, the UE provides user data. In substep 1921 (which may be optional) of step 1920, the UE provides the user data by executing a client application. In substep 1911 (which may be optional) of step 1910, the UE executes a client application which provides the user data in reaction to the received input data provided by the host computer. In providing the user data, the executed client application may further consider user input received from the user. Regardless of the specific manner in which the user data was provided, the UE initiates, in substep 1930 (which may be optional), transmission of the user data to the host computer. In step 1940 of the method, the host computer receives the user data transmitted from the UE, in accordance with the teachings of the embodiments described throughout this disclosure.

Figure 20:
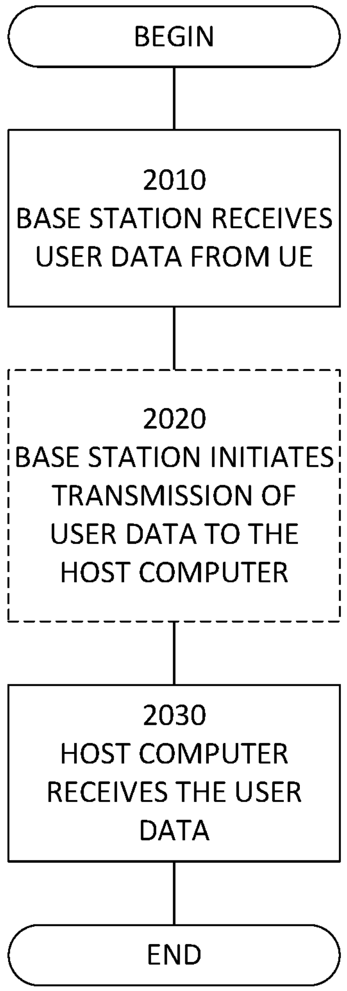
FIG. 20 is a flowchart illustrating a method implemented in a communication system, in accordance with one embodiment.

FIG. 20 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 20 will be included in this section. In step 2010 (which may be optional), in accordance with the teachings of the embodiments described throughout this disclosure, the base station receives user data from the UE. In step 2020 (which may be optional), the base station initiates transmission of the received user data to the host computer. In step 2030 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

In view of the above, then, embodiments herein generally include a communication system including a host computer. The host computer may comprise processing circuitry configured to provide user data. The host computer may also comprise a communication interface configured to forward the user data to a cellular network for transmission to a user equipment (UE). The cellular network may comprise a base station having a radio interface and processing circuitry, the base station's processing circuitry configured to perform any of the steps of any of the embodiments described above for a base station.

In some embodiments, the communication system further includes the base station.

In some embodiments, the communication system further includes the UE, wherein the UE is configured to communicate with the base station.

In some embodiments, the processing circuitry of the host computer is configured to execute a host application, thereby providing the user data. In this case, the UE comprises processing circuitry configured to execute a client application associated with the host application.

Embodiments herein also include a method implemented in a communication system including a host computer, a base station and a user equipment (UE). The method comprises, at the host computer, providing user data. The method may also comprise, at the host computer, initiating a transmission carrying the user data to the UE via a cellular network comprising the base station. The base station performs any of the steps of any of the embodiments described above for a base station.

In some embodiments, the method further comprising, at the base station, transmitting the user data.

In some embodiments, the user data is provided at the host computer by executing a host application. In this case, the method further comprises, at the UE, executing a client application associated with the host application.

Embodiments herein also include a user equipment (UE) configured to communicate with a base station. The UE comprises a radio interface and processing circuitry configured to perform any of the embodiments above described for a UE.

Embodiments herein further include a communication system including a host computer. The host computer comprises processing circuitry configured to provide user data, and a communication interface configured to forward user data to a cellular network for transmission to a user equipment (UE). The UE comprises a radio interface and processing circuitry. The UE's components are configured to perform any of the steps of any of the embodiments described above for a UE.

In some embodiments, the cellular network further includes a base station configured to communicate with the UE.

In some embodiments, the processing circuitry of the host computer is configured to execute a host application, thereby providing the user data. The UE's processing circuitry is configured to execute a client application associated with the host application.

Embodiments also include a method implemented in a communication system including a host computer, a base station and a user equipment (UE). The method comprises, at the host computer, providing user data and initiating a transmission carrying the user data to the UE via a cellular network comprising the base station. The UE performs any of the steps of any of the embodiments described above for a UE.

In some embodiments, the method further comprises, at the UE, receiving the user data from the base station.

Embodiments herein further include a communication system including a host computer. The host computer comprises a communication interface configured to receive user data originating from a transmission from a user equipment (UE) to a base station. The UE comprises a radio interface and processing circuitry. The UE's processing circuitry is configured to perform any of the steps of any of the embodiments described above for a UE.

In some embodiments the communication system further includes the UE.

In some embodiments, the communication system further including the base station. In this case, the base station comprises a radio interface configured to communicate with the UE and a communication interface configured to forward to the host computer the user data carried by a transmission from the UE to the base station.

In some embodiments, the processing circuitry of the host computer is configured to execute a host application. And the UE's processing circuitry is configured to execute a client application associated with the host application, thereby providing the user data.

In some embodiments, the processing circuitry of the host computer is configured to execute a host application, thereby providing request data. And the UE's processing circuitry is configured to execute a client application associated with the host application, thereby providing the user data in response to the request data.

Embodiments herein also include a method implemented in a communication system including a host computer, a base station and a user equipment (UE). The method comprises, at the host computer, receiving user data transmitted to the base station from the UE. The UE performs any of the steps of any of the embodiments described above for the UE.

In some embodiments, the method further comprises, at the UE, providing the user data to the base station.

In some embodiments, the method also comprises, at the UE, executing a client application, thereby providing the user data to be transmitted. The method may further comprise, at the host computer, executing a host application associated with the client application.

In some embodiments, the method further comprises, at the UE, executing a client application, and, at the UE, receiving input data to the client application. The input data is provided at the host computer by executing a host application associated with the client application. The user data to be transmitted is provided by the client application in response to the input data.

Embodiments also include a communication system including a host computer. The host computer comprises a communication interface configured to receive user data originating from a transmission from a user equipment (UE) to a base station. The base station comprises a radio interface and processing circuitry. The base station's processing circuitry is configured to perform any of the steps of any of the embodiments described above for a base station.

In some embodiments, the communication system further includes the base station.

In some embodiments, the communication system further includes the UE. The UE is configured to communicate with the base station.

In some embodiments, the processing circuitry of the host computer is configured to execute a host application. And the UE is configured to execute a client application associated with the host application, thereby providing the user data to be received by the host computer.

Embodiments moreover include a method implemented in a communication system including a host computer, a base station and a user equipment (UE). The method comprises, at the host computer, receiving, from the base station, user data originating from a transmission which the base station has received from the UE. The UE performs any of the steps of any of the embodiments described above for a UE.

In some embodiments, the method further comprises, at the base station, receiving the user data from the UE.

In some embodiments, the method further comprises, at the base station, initiating a transmission of the received user data to the host computer.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate.

Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The term "A and/or B" as used herein covers embodiments having A alone, B alone, or both A and B together. The term "A and/or B" may therefore equivalently mean "at least one of any one or more of A and B".

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method performed by fuzz testing equipment for fuzz testing a system under test (SUT) configured for use in a wireless communication network, the method comprising:

obtaining a message specification that governs a certain type of message whose handling by the SUT is to be tested;

mutating the message specification, the message specification specifying one or more requirements in order for a message to conform to the message specification, and the mutating comprising mutating at least one of the one or more requirements, the one or more requirements comprising a field requirement, the field requirement requiring a message of the certain type to have a set of one or more required fields in order for the message to conform to the message specification and mutating at least one of the one or more requirements comprising at least one of adding a required field to the set and removing a required field from the set; and performing, or assisting with, testing of the SUT using a message that is fuzzed based on the mutated message specification;

the fuzz testing equipment being implemented in a radio network node and the SUT being a wireless communication device, and at least one of:

the certain type of message is a Radio Resource Control (RRC) message, and the fuzzed message is a fuzzed RRC message; or the certain type of message is a Non-Access Stratum (NAS) message, and the fuzzed message is a fuzzed NAS message.

2. The method of claim 1, wherein mutating at least one of the one or more requirements includes relaxing at least one of the one or more requirements.

3. The method of claim 1, wherein at least of:

the one or more requirements include a field value requirement, wherein the field value requirement requires a field of a message of the certain type to have a value included in a set of one or more valid values in order for the message to conform to the message specification, and wherein mutating at least one of the one or more requirements comprises relaxing the field value requirement by adding one or more additional valid values to the set of one or more valid values;

the one or more requirements include a data type requirement, wherein the data type requirement requires a field of a message of the certain type to have a certain data type in order for the message to conform to the message specification, and wherein mutating at least one of the one or more requirements comprises changing the data type requirement to require the field of the message to have a different data type;

the one or more requirements include a field name requirement, wherein the field name requirement requires a field of a message of the certain type to have a certain name in order for the message to conform to the message specification, and wherein mutating at least one of the one or more requirements comprises changing the field name requirement to require the field of the message to have a different name; or the one or more requirements include a field value length requirement, wherein the field value length requirement requires a value of a field of a message of the certain type to have a certain length in order for the message to conform to the message specification, and wherein mutating at least one of the one or more requirements comprises changing the field value length requirement to require a value of the field of the message to have a different length.

4. The method of claim 1, wherein said performing comprises:

fuzzing a message of the certain type based on the mutated message specification; and testing the SUT by sending the fuzzed message to the SUT.

5. The method of claim 4, wherein fuzzing the message of the certain type based on the mutated message specification comprises:

compiling, based on the mutated message specification, a message data structure that defines a data structure of a message conforming to the mutated message specification; and obtaining the fuzzed message as a message that has a data structure defined by the compiled message data structure.

6. The method of claim 5, wherein the message specification and the mutated message specification are each specified in terms of an interface description language which is programming language agnostic, and wherein the compiled message data structure defines a programming language specific data structure of a message conforming to the mutated message specification.

7. The method of claim 5, wherein obtaining the fuzzed message comprises:

generating, from scratch, the fuzzed message as a message that has a data structure defined by the compiled message data structure; or obtaining the fuzzed message as a function of a decoded nominal message and the compiled message data structure, wherein the decoded nominal message is decoded using a message decoder compiled based on the message specification.

8. The method of claim 5, further comprising:

compiling a message encoder based on the mutated message specification; and encoding the fuzzed message using the compiled message encoder;

wherein sending the fuzzed message to the SUT comprises sending the fuzzed message as encoded to the SUT.

9. The method of claim 1, wherein assisting with testing of the SUT comprises sending the mutated message specification to other fuzz testing equipment configured to test the SUT using a message that is fuzzed based on the mutated message specification.

10. The method of claim 1, wherein the message specification is specified in an Interface Description Language, IDL.

11. The method of claim 10, wherein the IDL is Abstract Syntax Notation One, ASN.1.

12. Fuzz testing equipment for fuzz testing a system under test (SUT) configured for use in a wireless communication network, the fuzz testing equipment comprising:

communication circuitry; and processing circuitry configured to:

obtain a message specification that governs a certain type of message whose handling by the SUT is to be tested;

mutate the message specification, the message specification specifying one or more requirements in order for a message to conform to the message specification, and the mutating comprising mutating at least one of the one or more requirements, the one or more requirements comprising a field requirement, the field requirement requiring a message of the certain type to have a set of one or more required fields in order for the message to conform to the message specification and mutating at least one of the one or more requirements comprising at least one of adding a required field to the set and removing a required field from the set; and perform, or assist with, testing of the SUT using a message that is fuzzed based on the mutated message specification, the fuzz testing equipment being implemented in a radio network node and the SUT being a wireless communication device; and at least one of:

the certain type of message is a Radio Resource Control (RRC) message, and the fuzzed message is a fuzzed RRC message; or the certain type of message is a Non-Access Stratum (NAS) message, and the fuzzed message is a fuzzed NAS message.

13. The fuzz testing equipment of claim 12, wherein the processing circuitry is configured to mutate at least one of the one or more requirements by relaxing at least one of the one or more requirements.

14. The fuzz testing equipment of claim 12, wherein at least of:

the one or more requirements include a field value requirement, wherein the field value requirement requires a field of a message of the certain type to have a value included in a set of one or more valid values in order for the message to conform to the message specification, and wherein the processing circuitry is configured to relax the field value requirement by adding one or more additional valid values to the set of one or more valid values;

the one or more requirements include a data type requirement, wherein the data type requirement requires a field of a message of the certain type to have a certain data type in order for the message to conform to the message specification, and wherein the processing circuitry is configured to change the data type requirement to require the field of the message to have a different data type;

the one or more requirements include a field name requirement, wherein the field name requirement requires a field of a message of the certain type to have a certain name in order for the message to conform to the message specification, and wherein the processing circuitry is configured to change the field name requirement to require the field of the message to have a different name; or the one or more requirements include a field value length requirement, wherein the field value length requirement requires a value of a field of a message of the certain type to have a certain length in order for the message to conform to the message specification, and wherein the processing circuitry is configured to change the field value length requirement to require a value of the field of the message to have a different length.

* * * * *